US012028896B2

(12) United States Patent
Xue et al.

(10) Patent No.: US 12,028,896 B2
(45) Date of Patent: Jul. 2, 2024

(54) METHODS AND SYSTEM FOR ESTABLISHING MULTIPLE STARTING POINTS FOR SIDELINK TRANSMISSIONS

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/445,306

(22) Filed: Aug. 17, 2021

(65) Prior Publication Data

US 2022/0095369 A1 Mar. 24, 2022

Related U.S. Application Data

(60) Provisional application No. 63/082,159, filed on Sep. 23, 2020.

(51) Int. Cl.
*H04W 74/04* (2009.01)
*H04W 16/14* (2009.01)
*H04W 92/18* (2009.01)

(52) U.S. Cl.
CPC .......... *H04W 74/04* (2013.01); *H04W 16/14* (2013.01); *H04W 92/18* (2013.01)

(58) Field of Classification Search
CPC ...... H04W 74/04; H04W 16/14; H04W 92/18
See application file for complete search history.

(56) References Cited

U.S. PATENT DOCUMENTS

| 11,818,070 | B2* | 11/2023 | Do | H04W 72/20 |
| 2018/0062809 | A1* | 3/2018 | Baghel | H04L 1/0061 |
| 2019/0007974 | A1* | 1/2019 | Nguyen | H04L 67/12 |
| 2019/0150197 | A1* | 5/2019 | Sheu | H04W 74/0816 370/329 |
| 2020/0196306 | A1* | 6/2020 | Si | H04L 5/001 |
| 2021/0007081 | A1* | 1/2021 | Shin | H04L 1/1896 |
| 2021/0021536 | A1* | 1/2021 | Ganesan | H04L 1/1893 |
| 2021/0029719 | A1* | 1/2021 | Zhou | H04L 5/0055 |
| 2021/0050954 | A1* | 2/2021 | Ryu | H04W 72/02 |
| 2021/0105789 | A1* | 4/2021 | Freda | H04W 72/56 |
| 2021/0219320 | A1* | 7/2021 | Belleschi | H04W 72/20 |

(Continued)

*Primary Examiner* — Christopher M Crutchfield
*Assistant Examiner* — Tito Q Pham
(74) *Attorney, Agent, or Firm* — Haynes and Boone LLP

(57) ABSTRACT

Wireless communications systems and methods related to multiple starting points for new radio sidelink transmission over unlicensed band are provided. In some aspects, a UE may perform a channel access procedure to access a first physical sidelink shared channel (PSSCH) transmission resource of an unlicensed new radio spectrum. In some aspects, the first PSSCH transmission resource may be reserved by a control message and may include a plurality of transmission starting points. Further, the first UE may transmit first data to a second UE via the first PSSCH transmission resource starting at a later transmission starting point than one or more prior transmission starting points of the plurality of transmission starting points when the performing the channel access procedure fails at each of the one or more prior transmission starting points.

30 Claims, 9 Drawing Sheets

(56) References Cited

U.S. PATENT DOCUMENTS

| | | | |
|---|---|---|---|
| 2021/0274545 A1* | 9/2021 | Adjakple | H04W 72/21 |
| 2021/0400650 A1* | 12/2021 | Shilov | H04L 5/0053 |
| 2022/0039080 A1* | 2/2022 | Khoryaev | H04W 4/40 |
| 2022/0078802 A1* | 3/2022 | Zhao | H04L 5/0053 |
| 2022/0255680 A1* | 8/2022 | Moon | H04L 5/0055 |
| 2022/0303059 A1* | 9/2022 | Hahn | H04L 1/1896 |
| 2022/0330261 A1* | 10/2022 | Yeo | H04L 5/0053 |
| 2022/0369291 A1* | 11/2022 | Shibaike | H04L 1/1893 |
| 2022/0377749 A1* | 11/2022 | Lee | H04W 28/26 |
| 2023/0224959 A1* | 7/2023 | Wu | H04W 74/0808 370/329 |

* cited by examiner

METHODS AND SYSTEM FOR ESTABLISHING MULTIPLE STARTING POINTS FOR SIDELINK TRANSMISSIONS

CROSS-REFERENCE TO RELATED APPLICATIONS

The present application claims priority to and the benefit of the U.S. Provisional Patent Application No. 63/082,159, filed Sep. 23, 2020, titled "Methods and System for Establishing Multiple Starting Points for Sidelink Transmissions," which is hereby incorporated by reference in its entirety as if fully set forth below and for all applicable purpose.

TECHNICAL FIELD

This application relates to wireless communication systems, and more particularly to allowing multiple starting points for new radio sidelink transmission over an unlicensed band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum. Additionally, NR sidelink may be extended to support applications in other domains, such as enhanced mobile broadband (eMBB), ultra-reliable low-latency communications (URLLC), etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the present disclosure, a method of wireless communication performed by a first user equipment (UE), includes performing a channel access procedure to access a first physical sidelink shared channel (PSSCH) transmission resource of an unlicensed new radio spectrum, the first PSSCH transmission resource reserved by a control message and including a plurality of transmission starting points. The method further comprises transmitting a first data to a second UE via the first PSSCH transmission resource starting at a later transmission starting point than one or more prior transmission starting points of the plurality of transmission starting points when the performing the channel access procedure fails at each of the one or more prior transmission starting points, the one or more prior transmission starting points including an initial transmission starting point of the plurality of transmission starting points.

In some aspects, a first user equipment (UE) comprises a processor configured to: perform a channel access procedure to access a first physical sidelink shared channel (PSSCH) transmission resource of an unlicensed new radio spectrum, the first PSSCH transmission resource reserved by a control message and including a plurality of transmission starting points. The processor is further configured to transmit first data to a second UE via the first PSSCH transmission resource starting at a later transmission starting point than one or more prior transmission starting points of the plurality of transmission starting points when the performing the channel access procedure fails at each of the one or more prior transmission starting points, the one or more prior transmission starting points including an initial transmission starting point of the plurality of transmission starting points.

In some aspects of the present disclosure, a non-transitory computer-readable medium having program code recorded thereon is disclosed. In some aspects, the program code comprises code for causing a first user equipment (UE) to perform a channel access procedure to access a first physical sidelink shared channel (PSSCH) transmission resource of an unlicensed new radio spectrum, the first PSSCH transmission resource reserved by a control message and including a plurality of transmission starting points. Further, the program code comprises code for causing the first UE to transmit first data to a second UE via the first PSSCH transmission resource starting at a later transmission starting point than one or more prior transmission starting points of the plurality of transmission starting points when the performing the channel access procedure fails at each of the one or more prior transmission starting points, the one or more prior transmission starting points including an initial transmission starting point of the plurality of transmission starting points.

In some aspects of the present disclosure, a first user equipment (UE) comprises means for performing a channel access procedure to access a first physical sidelink shared channel (PSSCH) transmission resource of an unlicensed new radio spectrum, the first PSSCH transmission resource reserved by a control message and including a plurality of transmission starting points. The first UE further comprises means for transmitting a first data to a second UE via the first PSSCH transmission resource starting at a later transmission starting point than one or more prior transmission starting points of the plurality of transmission starting points when the performing the channel access procedure fails at each of the one or more prior transmission starting points, the one or more prior transmission starting points including an initial transmission starting point of the plurality of transmission starting points.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
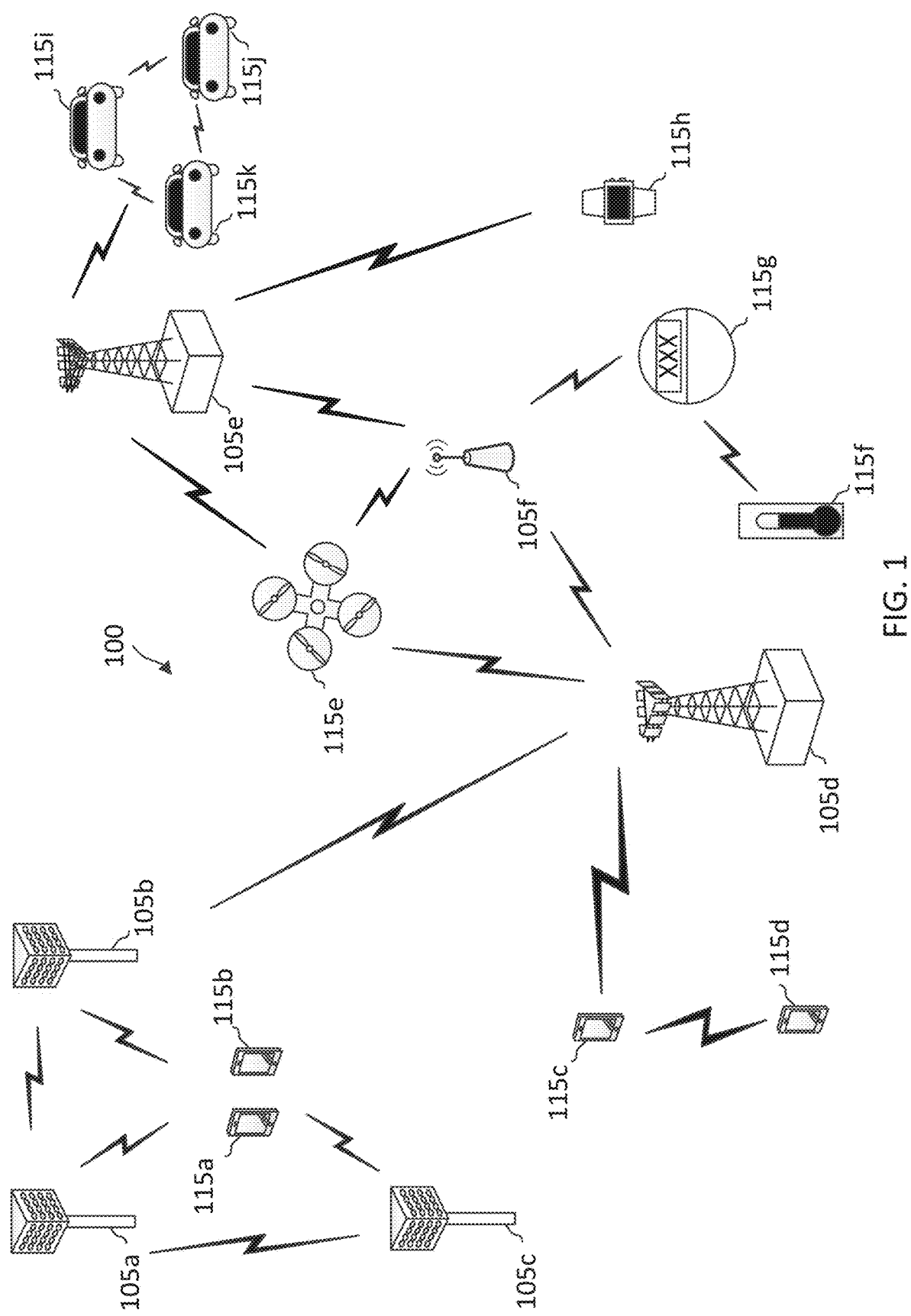
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some cases, the SCI may include two stages of control information, the first control information SCI-1, carried over PSCCH, including occupancy and/or reservation information understood by receiving UEs and the second control information SCI-2, carried over PSSCH, including control information for targeted receives (i.e., receives that are to receive the data being transmitted via PSSCH).

Further, physical sidelink feedback channel (PSFCH) can be used to communicate hybrid automatic repeat request acknowledgment/negative acknowledgment (HARQ ACK/NACK) messages between the UEs (e.g., for reliable unicast). For instance, a receiver sidelink UE (SL UE) can transmit a sequence carrying a 1-bit HARQ response to a transmitted SL UE two slots later. Use cases for sidelink communication may include peer-to-peer communications and/or star topology networks/applications such as but not limited to V2X, intelligent transport systems (ITS), enhanced mobile broadband (eMBB), industrial IoT (IIoT), ultra-reliable low-latency communications (URLLC), NR-lite, and/or the like.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., next generation NodeB (gNB)) may determine a radio resource on behalf of a SL UE and transmit an indication of the radio resource to the SL UE. That is, a SL UE may receive grant from a gNB for channel access. The mode-2 RRA supports autonomous or standalone RRA where a SL peripheral UE, such as but not limited to out-of-coverage SL UEs or partial-coverage SL UEs, may conduct sensing to autonomously occupy or reserve channel access. A SL UE may be preconfigured with a sidelink resource pool and may select a radio resource from the preconfigured sidelink resource pool for sidelink communication. A distributed congestion control or quality of service mechanism may regulate at least aspects of channel access by SL UEs. For example, a distributed congestion control may specify a range of channel occupancy ratios (CRs) for a given channel busy ratio (CBR) (e.g., suitable for general sidelink applications) and specify a number of allowable retransmissions without reducing a transmit power. Each SL UE may measure its own CBR, which may be mapped to a CR limit to regulate the number of channel use within a sliding window of time. For this mode, it may be possible for sidelink systems to operate independent of a serving BS. A CBR is a metric indicating a number of subchannels (e.g., frequency sub-bands) in a sidelink resource pool with a measured receive signal strength indicator (RSSI) greater than a preconfigured threshold divided by the total number of subchannels in the resource pool. The CBR metric can be computed for a certain number of time intervals or subframes. The CBR can provide an estimation on the total state of the channel.

As noted above, NR can operate over a wide array of spectrum bands, including mid-frequency bands from about 1 GHz to about 6 GHz. Because the noted mid-frequency bands can be shared frequency bands and/or unlicensed frequency bands, the base stations and UEs that are part of a 5 g or NR network may employ a listen-before-talk (LBT)

procedure to monitor for transmission opportunities (TXOPs) in the shared channels. A TXOP may also be referred to as channel occupancy time (COT). For example, a transmitting node (e.g., a BS or a UE) may perform an LBT prior to transmitting in the channel. When the LBT passes, the transmitting node may proceed with the transmission, and when the LBT fails, the transmitting node may refrain from transmitting in the channel.

LBT procedures may have two forms or variants, so-called frame-based equipment (FBE) that allows unlicensed devices to contend for a channel starting only at synchronized frame boundaries and so-called load-based equipment (LBE) that allows devices to contend for the channel as soon as the channel becomes idle. An LBT procedure can be based on energy detection or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. LBE-based LBTs may have a variety of modes, including a category 4 (CAT4) LBT (also known as type 1 LBT), a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node (e.g., a transmitting BS or UE) may draw a random number and backoff for a duration based on the drawn random number in a certain time unit. In CAT4 LBT, a node conducts channel access in an asynchronous way, starting LBT procedure at any instant when the channel is available, and occupying the channel immediately when the LBT procedure is successful (e.g., thereby allowing µs-level time granularity for channel access).

A node accessing channels of unlicensed bands for smaller time granularity (e.g., µs-level) using LBE-based LBT procedures may, however, cause other nodes that access channels for larger time granularities (e.g., 1 ms level) to starve for channel access, as the latter nodes may be in inferior position to access the channels compared to the former nodes. In some cases, the starvation for channel access for nodes using larger time granularities for transmissions may be ameliorated by allowing finer granularities, such as but not limited to mini-slots with two, four, seven, etc., OFDM symbol granularities for transmissions, which can also be advantageous as the finer granularities facilitate ultra-low latency. There can, however, still be channel access challenges for such nodes with the implementation of mini-slots in NR SL communications because, for example, nodes such as SL UEs may still have difficulty obtaining COT or TXOP using the mini-slot granularities. As another example, SL UEs using smaller sub-carrier spacing (SCS) may end up being starved for channel access if there are nearby LBE-based nodes (e.g., WiFi® nodes, LTE LAA nodes, NR-U nodes, etc.).

In some cases, LBT robustness against channel access starvation for a node (e.g., SL UE) may be improved by allowing the node to transmit a "filler" transmission after completing LBT at a given time t but prior to the start time T of the COT obtained via the LBT, i.e., between the time t and the boundary T of the TTI of the COT. The "filler" transmission may at least mitigate channel access starvation by preventing another LBE-based node from occupying the channel between times t and T. Such approaches may be useful for improving channel access particularly at base station nodes (e.g., gNBs) because the number of gNBs within a region may be limited and the overhead associated with the transmission of the "filler" can be moderate. But these approaches may not be as useful for improving channel access procedures for nodes such as SL UEs, because of massive number of SL UEs within a region and the overhead associated with the "filler" transmission being high for devices such as SL UEs (e.g., in comparison to devices such as gNBs). As such, there is a desire to provide a mechanism that facilitates new radio sidelink transmissions over unlicensed bands, for example, by allowing NR SL UEs to have multiple starting points within a slot of a reserved transmission (e.g., within a transmission resource of a PSSCH transmission). For example, the intended receiver SL UE of the transmission may receive information about the transmission (e.g., via a control information such as CSI) from the transmitting SL UE or other third-party (e.g., the base station to which the transmitting and receiving SL UEs are attached or another SL UE). In some cases, the transmitting SL UE may transmit starting at the later starting point after receiving an acknowledgment from the receiving SL UE with respect to the control information. In some cases, the transmitting SL UE may conduct a stricter LBT to start transmitting at the later starting point. Further, the later starting point can be bounded by DMRS symbols Aspects of the present disclosure can provide several benefits. In some aspects, the mechanism that facilitates NR SL transmissions over unlicensed bands may improve latency as SL UEs that contend for COT of unlicensed bands may not starve for channel access due to nearby LBE-based nodes that may access the channels with smaller time granularities or intervals. Further, in some cases, devices that may not have access to a licensed spectrum may enjoy the benefit of NR technologies via new radio sidelink transmissions over unlicensed bands. In addition, SL UEs may save power by avoiding the need to transmit filler transmissions (i.e., transmissions with little or no useful information) and/or conduct large number of LBT procedures to access a channel in competition with other nearby nodes.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. The UE 115 may also receive one or more system information blocks (SIGs). For example, SIB1 may contain cell access parameters and scheduling information for other Ms. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a LBT procedure to monitor for TXOPs in the shared channel, which may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA). In some other aspects, the network 100 may support sidelink communication among the UEs 115 in a licensed frequency band.

Figure 2:
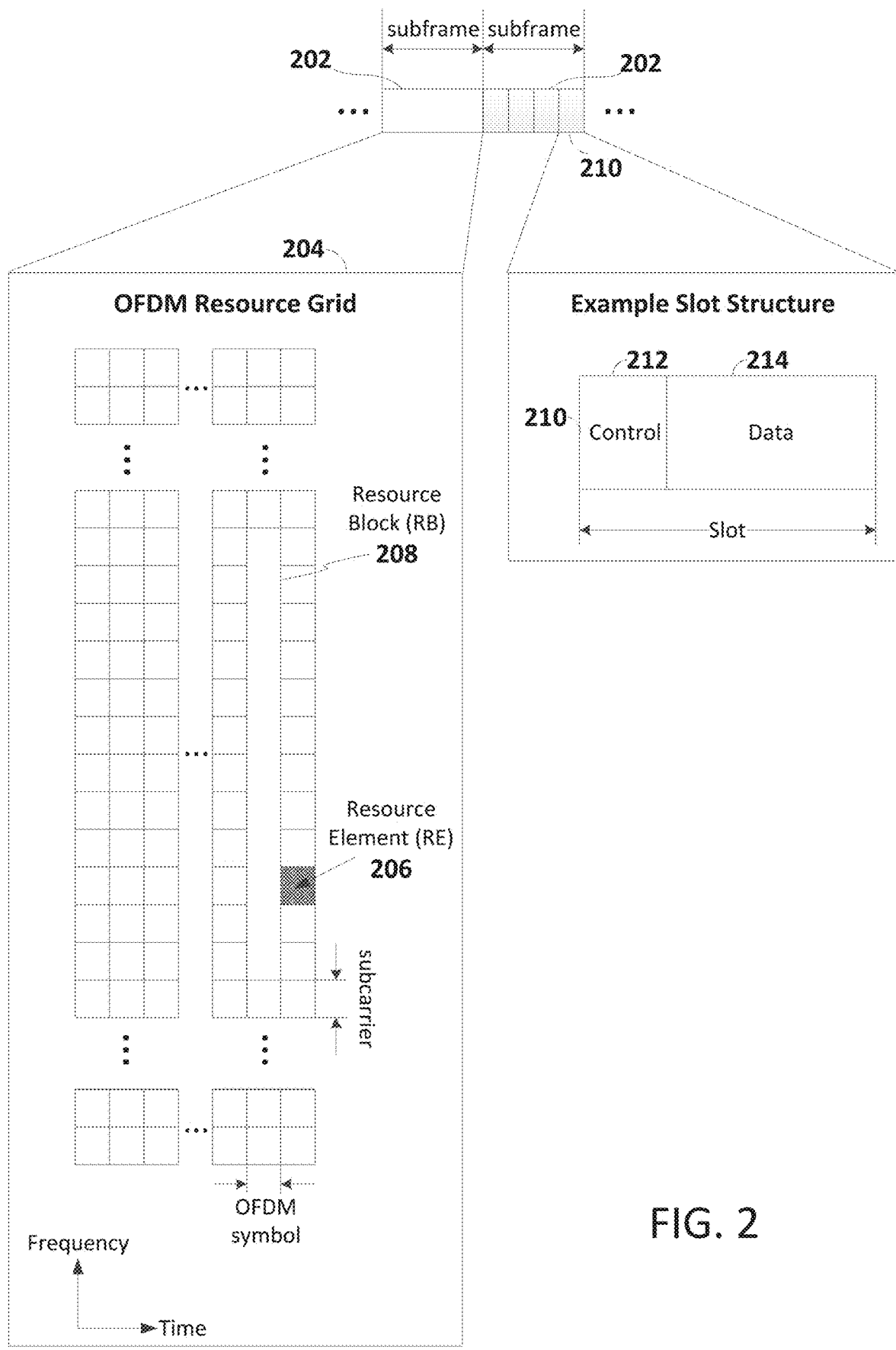
FIG. 2 illustrates an example schematic of an organization of wireless resources in an air interface utilizing orthogonal frequency divisional multiplexing (OFDM), according to some aspects of the present disclosure.

FIG. 2 illustrates an example schematic of an organization of wireless resources in an air interface utilizing orthogonal frequency divisional multiplexing (OFDM), according to some aspects of the present disclosure. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms. In FIG. 2, an expanded view of an exemplary subframe 202 is illustrated, showing an OFDM resource grid. However, as those skilled in the art can readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The radio frame structure or resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, in some aspects, it can be assumed that a single RB such as the RB 208 entirely corresponds to a single direction of communication (either transmission or reception for a given device).

Scheduling of UEs (e.g., sidelink UEs hereinafter collectively referred to as UEs) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

According to some examples, a frame may refer to a duration of 10 ms, with each frame sub-divided into 10 subframes 202 of 1 ms each. Each 1 ms subframe may consist of one or multiple adjacent slots. In the example shown in FIG. 2, subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 210 illustrates the slot as including a control region 212 and a data region 214. In general, the control region 212 may carry control channels (e.g., PDCCH, PSCCH, etc.), and the data region 214 may carry data channels (e.g., PDSCH, PUSCH, PSSCH, etc.). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s). In various aspects of the present disclosure, the data region 214 may be reserved for transmitting PSSCH transmission, and in such cases, may be referred to as a PSSCH transmission resource (i.e., a transmission resource configured for a first UE (e.g., a sidelink UE) to transmit a sidelink transmission or transport block (TB) to a second UE (e.g., a sidelink UE).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a PBCH; a PSS; a SSS; a physical control format indicator channel (PCFICH); a physical HARQ indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink UE (e.g., V2X or other sidelink device) towards a set of one or more other receiving sidelink UEs. The PSCCH may include HARQ feedback information (e.g., ACK/NACK) that may be used to indicate a need, or lack of need, for retransmissions on the sidelink. The data region 214 of the slot 210 may include a physical sidelink shared channel (PSSCH) including the data transmitted by the initiating (transmitting) sidelink UE within resources reserved over the sidelink carrier by the transmitting sidelink UE.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above are not necessarily all the channels or carriers that may be utilized between a scheduling entity 108 and scheduled entities (e.g., one of more UE 106), and those of ordinary skill in the art may recognize that other channels or carriers may be utilized in addition to those illustrated, such as other traffic, control, and feedback channels.

Figure 3:
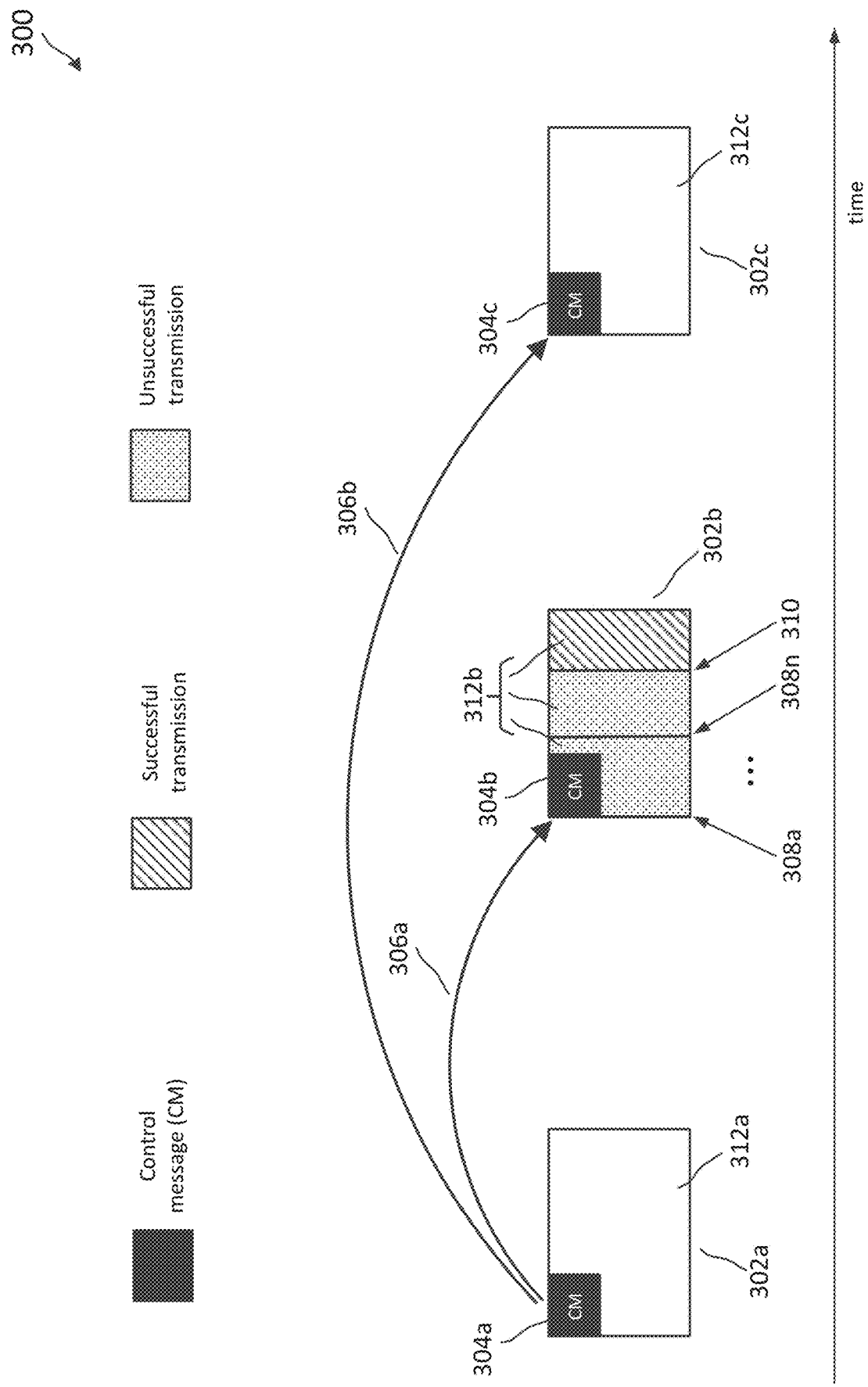
FIG. 3 illustrates multiple starting points for new radio (NR) sidelink (SL) transmission within a reserved physical sidelink shared channel (PSSCH) of an unlicensed band, according to some aspects of the present disclosure.

FIG. 3 illustrates the use of multiple starting points for new radio (NR) sidelink (SL) transmission within a reserved physical sidelink shared channel (PSSCH) of an unlicensed band, according to some aspects of the present disclosure. In some aspects, a first SL UE may be scheduled to transmit a transport block (TB) containing data packets to a second SL UE via a data channel in a slot of unlicensed or shared frequency band, i.e., the data channel (e.g., PSSCH) in a slot of a radio frame structure or resource grid may be reserved for the use of the first SL UE to transmit TBs to the second SL UE. In some aspects, as mentioned above, the slot reserved for transmitting the PSSCH transmission may be interchangeably referred to as a PSSCH transmission resource. The first SL UE and the second SL UE may correspond to UEs 115 in the network 100 and may be equipped with wireless communication devices that allow the first SL UE and the second SL UE to communicate with each other (e.g., and other UEs) over a wireless channel (e.g., a sidelink) utilizing slots 302a, 302b, 302c of unlicensed or shared frequency bands. The slots 302a, 302b, 302c may correspond to slot 210 discussed with respect to FIG. 2, and may include control region 304a, 304b, 304c having a control channel (e.g., PSCCH) carrying a control message (e.g., sidelink control information (SCI) message, medium access control (MAC)-control element (CE) message, proximity-based communication (Interface) 5 radio resource control (PC5-RRC) message, etc.) transmitted by the first SL UE to the second SL UE. The slots 302a, 302b, 302c may also include data regions 312a, 312b, 312c having a data channel (e.g., PSSCH) carrying data transmission (i.e., TBs containing data) from the first SL UE to the second SL UE.

In some aspects, a PSSCH transmission resource being "reserved" for the use of the first SL UE to transmit TBs to the second SL UE may refer to the knowledge of, or expectation by, the second SL UE about an incoming TB transmission via the PSSCH (e.g., from the first SL UE). For example, the second SL UE may have received or otherwise obtained information related to the time-frequency resources of the PSSCH, various formats of the PSSCH including but not limited to MCSs (e.g., low-density parity check (LDPC) coding scheme, turbo coding scheme, convolutional coding scheme, digital beamforming scheme, etc.), HARQ mechanisms that may be utilized for the data transmission, and/or the like. In some aspects, the second SL UE may obtain the reservation information from the first SL UE or a third-party such as but not limited to a BS (e.g., a BS to which the first SL UE is attached) or another SL UE different from the first SL UE. For example, the first SL UE may transmit to the second SL UE a control message including but not limited to the afore-mentioned SCI, MAC-CE, PC5-RRC, upper layer control packet, etc., to reserve the PSSCH. In some aspects, the reservation for the PSSCH transmission resource that the first SL UE uses to transmit TBs to the second SL UE may be made by the second SL UE itself.

In some aspects, the first SL UE (i.e., the SL UE configured to transmit TBs to the second SL UE) may transmit, via a PSSCH and to the second SL UE, a control message that is configured to reserve one or more (e.g., one, two, etc.) future PSSCH transmission resources with multiple transmission starting points that can be used for re-transmission of a failed PSSCH transmission or TB. That is, for example, a first SL UE may reserve a PSSCH transmission resource (e.g., a data region of a slot) for transmitting a TB to a second SL UE, where the PSSCH transmission resource may have multiple transmission starting points. In such cases, the first SL UE may schedule the transmission of the TB, or transmit the TB, to the second SL UE via the PSSCH transmission resource starting at the initial transmission starting point (e.g., of the multiple transmission starting points). In some instances, this transmission may fail and the first SL UE may then schedule the re-transmission of the TB via the PSSCH transmission resource starting at the next transmission starting point. If the re-transmission also fails, then the first SL UE may continue to successively schedule the re-transmission of the TB (i.e., attempt re-transmitting) via the PSSCH transmission resource starting at the remaining transmission starting points of the multiple transmission starting points until the transmission is successful. In some instances, as explained in more detail below, the transmission of a TB may fail when an LBT procedure performed by the first SL UE to check the availability of the PSSCH transmission resource for transmitting the TB fails. Further, the first SL UE may also consider a TB transmission to a second SL UE to have failed when the first SL UE fails to receive an ACK from the receiving SL UE acknowledging the arrival of the TB transmission.

FIG. 3 shows an example illustration where the first SL UE transmits to the second SL UE a control message in the control region 304a of the slot 302a that is configured to reserve, e.g., 306a and 306b, the PSSCH transmission resource 312b (i.e., the data region of slot 302b) and the PSSCH transmission resource 312c (i.e., the data region of slot 302c), where the PSSCH transmission resource 312b is shown having multiple transmission starting points 308a-308n, 310. Although FIG. 3 shows the reservation 306a, 306b of two PSSCH transmission resources 312b, 312c by the control message in the control region 304a, it is to be noted that FIG. 3 is a non-limiting example illustration, and that a control message may be configured to reserve any number of PSSCH transmission resources. For instance, the control message may be configured to reserve one future PSSCH transmission resource, up to two future PSSCH transmission resources, more than two PSSCH transmission resources, etc.). As noted above, in some instances, the reserved future PSSCH transmission resources may be used for re-transmission of the TB if, for example, the second SL UE fails to send and/or the first SL UE fails to receive, a HARQ ACK from the second LS UE acknowledging arrival of a prior TB transmission at, and proper decoding thereof by, the second SL UE.

In some aspects, the future PSSCH transmission resources 312b, 312c reserved by the control message in the control region 304a for transmitting a first TB may be used by the first SL UE for transmitting a second TB instead of, or in addition to, re-transmitting the first TB. That is, in some cases, the control message may be an advanced control message used by the first SL UE for reserving one or more future PSSCH transmission resources 312b, 312c to transmit a second TB that is different, or contains different data packets, from the first TB. In some cases, the advanced control message may also be used by the first SL UE to reserve the same one or more future PSSCH transmission resources 312b, 312c to re-transmit the first TB (e.g., if no HARQ ACK was received at the first SL UE from the second SL UE acknowledging the first TB). In some aspects, the advanced control message may include cross-carrier scheduling, i.e., the one or more PSSCH transmission resources 312b, 312c may be scheduled or reserved on a different component carrier than the component carrier on which the advanced control message that is used to reserve the one or more PSSCHs is transmitted. In some aspects, as discussed above, a SL UE (e.g., the first SL UE) may be preconfigured with a sidelink transmission resource pool and may select a radio resource from the preconfigured sidelink transmission resource pool for a sidelink communication. In such aspects, in some cases, the advanced control message may include cross-SL transmission resource pool scheduling, i.e., the one or more PSSCHs may be scheduled or reserved on a different sidelink transmission resource pool than the sidelink transmission resource pool used to transmit the advanced control message. As noted above, the control message can be SCI, MAC-CE, PC5-RRC, upper layer control packet, etc.

In some aspects, the first SL UE (i.e., the SL UE configured to transmit TBs to the second SL UE) may receive a configured grant (CG) from the BS that is configured to allocate a PSSCH transmission resource that the first SL UE can use to transmit a TB to the second SL UE. For example, the CG can be a primary synchronization signal (PSS) CG from the BS that indicates to the first SL UE resources (e.g., PSSCH) that first SL UE can use to transmit the TB to the second SL UE. In some aspects, upon receiving the CG from the BS, the first SL UE may communicate with the second SL UE to reserve the PSSCH transmission resource for the TB transmission. That is, in some cases, the first SL UE may transmit a control message including but not limited to a SCI, a MAC-CE, a PC5-RRC, an upper layer control packet, etc., to reserve the PSSCH transmission resource as discussed above (e.g., to provide the second SL UE the information related to the time-frequency resources of the PSSCH, various formats of the PSSCH, etc.).

In some aspects, as noted above, the second SL UE may reserve the PSSCH transmission resource that the first SL UE may use to transmit the TB to the second SL UE. In some cases, the second SL UE may transmit a first polling control message configured to poll the first SL UE to collect the data that comprises the TB for transmitting from the first SL UE to the second SL UE. That is, the polling control message from the second SL UE to the first SL UE may be configured to cause the first SL UE to prepare the TB for transmission to the second SL UE. The second SL UE may then transmit a PSSCH data transmission including a second control message (e.g., a SCI, a MAC-CE, a PC5-RRC, an upper layer control packet, etc.) configured to reserve a PSSCH transmission resource that the first SL UE can use to transmit to the second SL UE the polled TB. In some aspects, the second control message may include cross-carrier scheduling, i.e., the PSSCH transmission resource may be reserved on a different component carrier than the component carrier on which the second control message that is used to reserve the PSSCH transmission resource is transmitted. In some aspects, the second control message may include cross-SL transmission resource pool scheduling, i.e., the PSSCH transmission resource may be reserved on a different SL transmission resource pool than the SL transmission resource pool used to transmit the second control message. In some aspects, the first polling control message and/or the second control message can be a SCI, a MAC-CE, a PC5-RRC, an upper layer control packet, etc.

Figure 4:
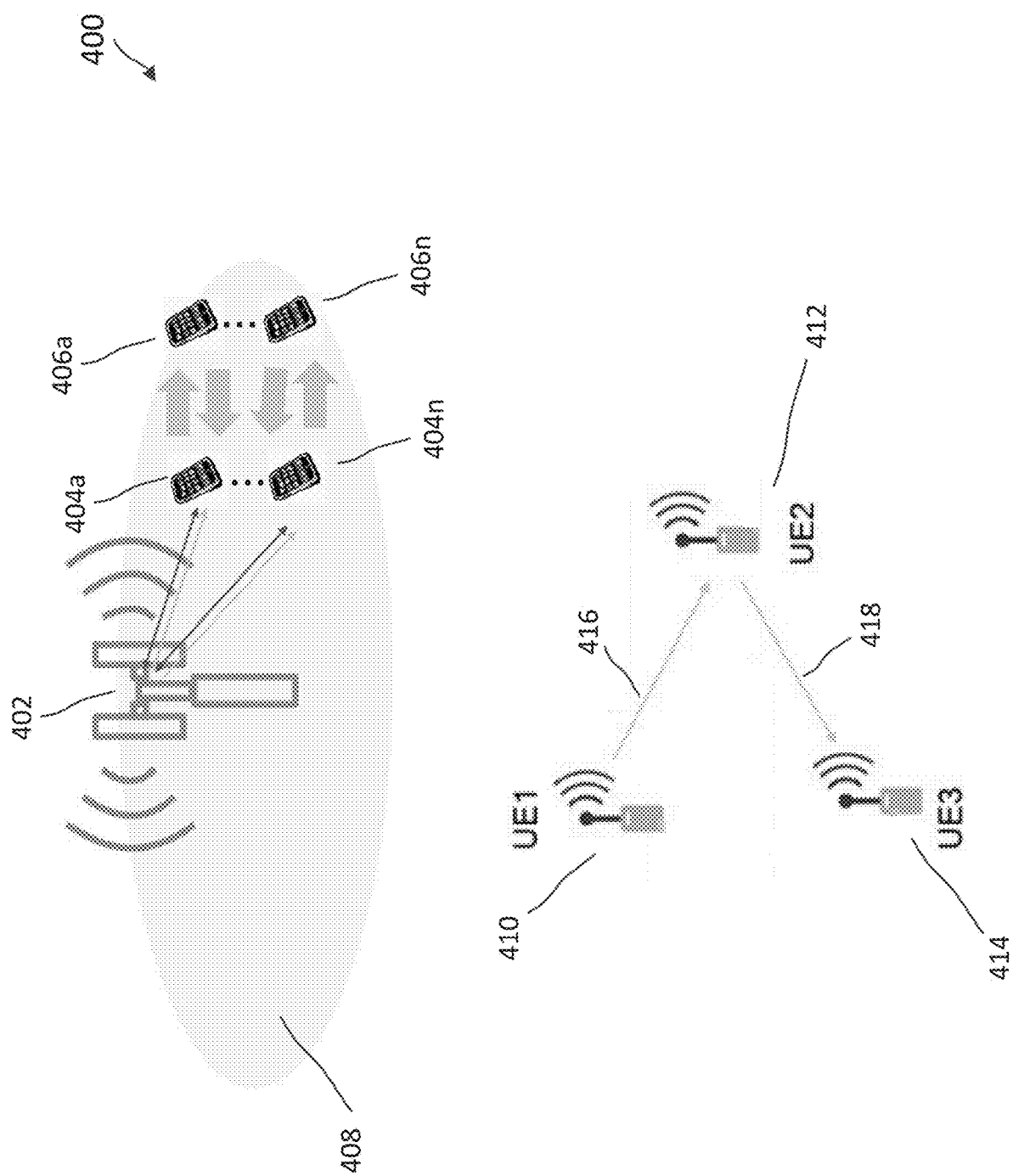
FIGS. 4A-4B show example illustrations of third-parties reserving PSSCH of an unlicensed band for NR SL transmission between a first SL UE and a second SL UE, according to some aspects of the present disclosure.

In some aspects, the PSSCH transmission resource that the first SL UE may use to transmit the TB to the second SL UE may be reserved by a third-party, such as but not limited to a base station to which the first SL UE and/or the second SL UE is connected or a third SL UE different from the first SL UE and the second SL UE. FIGS. 4A-4B show example illustrations of third-parties reserving PSSCH transmission resource of an unlicensed frequency band for NR SL transmission between a first SL UE and a second SL UE, according to some aspects of the present disclosure. With reference to FIG. 4A, in some aspects, both the first SL UE 404a . . . 404n and the second SL UE 406a . . . 406n may be within the coverage area of the BS 402, and the second SL UE 404a . . . 404n may receive from the BS 402 a downlink control information (DCI) message reserving a PSSCH of an unlicensed frequency band for use by the first SL UE 404a . . . 404n to transmit a TB to the second SL UE 406a . . . 406n. For example, the DCI message received at the second SL UE 406a . . . 406n from the BS 402 can be an enhanced DCI that includes a DCI 3-0 format message sent from the BS 402 to the first SL UE 404a . . . 404n allocating the PSSCH transmission resource for use by the first SL UE 404a . . . 404n (e.g., to transmit the TB to the second SL UE 406a . . . 406n). That is, the BS 402 may transmit (i) a DCI 3-0 format message to the first SL UE 404a . . . 404n allocating the PSSCH to the first SL UE 404a . . . 404n and (ii) an enhanced DCI including the DCI 3-0 format message to the second SL UE 406a . . . 406n to reserve the PSSCH for use by the first SL UE 404a . . . 404n to transmit a TB to the second SL UE 406a . . . 406n, i.e., to provide the second SL UE 406a . . . 406n information related to the time-frequency resources of the PSSCH, various formats of the PSSCH, etc., so that the first SL UE 404a . . . 404n can use the PSSCH transmission resource to transmit a TB to the second SL UE 406a . . . 406n.

In some aspects, as noted above, the PSSCH transmission resource that a second SL UE may use to transmit a TB to a third SL UE may be reserved by a first SL UE that is different from the second SL UE and the third SL UE. With reference to FIG. 4B, in some aspects, a first SL UE1 410 may be in communication, via a first sidelink 416, with a second SL UE2 412 that is in turn in communication, via a first sidelink 418, with a third SL UE3 414. In some aspects, FIG. 4B can be a schematic illustration of internet of things (IoT) or massive machine-type communications (mMTC) scenario where a factory or a production plant may include machines, industrial equipment, sensors, actuators, robots, and/or the like operating in assembly lines and/or production lines, which may generally be referred to as sensor/actuator (S/A) devices and represented in FIG. 4B by the third SL UE3 414. The production plant may employ programmable logic controllers (PLCs), represented in FIG. 4B by the second SL UE2 412, to control the operations of the S/A devices, for example, by sending control commands to the S/A devices and reading data, records, and/or measurements from the S/A devices. In some cases, the communications from the PLCs or second SL UE2 412 to the S/A devices or third SL UEs 414 may include low-latency transmissions from the PLCs (e.g., control commands, etc.). In some instances, the PLCs, i.e., the second SL UE2 412 may communicate with the S/A devices, i.e., the third SL UE3 414 over wireless channels, for example, using sidelink.

In some aspects, the PSSCH transmission resource that the second SL UE2 412 may use to transmit a TB, via the second sidelink 418, to the third SL UE3 414 may be reserved by the first SL UE1 410 that is different from the second SL UE2 412 and the third SL UE3 414. For example, the first SL UE1 410 may transmit, via the second sidelink 416, a control message to the second SL UE2 412 to reserve the PSSCH transmission resource so that the second SL UE2 412 may use the reserved PSSCH transmission resource to transmit, via the second sidelink 418, the TB to the third SL UE3 414. In some aspects, the control message can be a SCI, a MAC-CE, a PC5-RRC, an upper layer control packet, etc.

Returning to FIG. 3, some aspects of the present disclosure disclose multiple starting points for a SL transmission of a TB from a first SL UE to a second SL UE within a reserved PSSCH of an unlicensed band. As discussed above, the PSSCH transmission resource may be reserved by the first SL UE (i.e., the SL UE that is configured to transmit the TB to the second SL UE), by the second SL UE (i.e., the SL UE that is configured to receive the TB from the first SL UE), a third-party such as a BS to which the first SL UE is connected or another SL UE (i.e., different from the first SL UE and the second SL UE). In some aspects, the reservation may be made via a control message 304a that reserves, e.g., 306a, a PSSCH transmission resource 312b in the slot 302b for the TB transmission from the first SL UE to the second SL UE to start at the initial transmission starting point 308a. In some aspects, the first SL UE may perform a LBT procedure at the initial transmission starting point 308a to check that the PS SCH transmission resource 312b is available for the TB transmission by the first SL UE (e.g., and not occupied by nearby devices such as but not limited to LBE-based nodes (e.g., WiFi® nodes, LTE LAA nodes, NR-U nodes, etc.)). For example, the LBT procedure can be based on energy detection- or signal detection-based LBT procedure configured to determine whether the PSSCH is available for use by the first SL UE to transmit the TB to the second SL UE.

In some aspects, the LBT procedure may fail and the first SL UE may not be able to transmit the TB to the second SL UE starting at the initial transmission starting point 308*a* (i.e., the TB transmission may fail). For example, the first SL UE may detect in the PSSCH a signal or energy exceeding a threshold energy (e.g., about −72 dBm) and determine that the PSSCH transmission resource 312*b* is being used at the initial transmission starting point 308*a* and as such is unavailable for use by the first SL UE at that moment. In some aspects, the PSSCH transmission resource 312*b* in the slot 302*b* may have associated therewith multiple transmission starting points 308*a* ... 308*n*, 310 (including the initial transmission starting point 308*a*, for example) and the first SL UE may conduct another LBT procedure to transmit the TB starting at a later transmission starting point (e.g., the transmission starting points up to and including 308*n*, or 310) to determine whether the PSSCH has become available for the first SL UE to use the PSSCH transmission resource 312*b* to transmit the TB to the second SL UE. For example, the first SL UE may conduct another LBT procedure to transmit the TB starting at a transmission starting point 308*n* that is subsequent to the initial transmission starting point 308*a* and this LBT procedure may also fail because the PSSCH transmission resource 312*b* may be occupied by a transmission from a nearby device. The first SL UE may then keep conducting additional LBT procedures until a LBT procedure conducted for transmitting the TB at a later transmission starting point 310 is successful. That is, the first SL UE may determine, based on the LBT procedure conducted for transmitting the TB at the later transmission starting point 310, that the PSSCH transmission resource 312*b* is available for transmitting a TB to the second SL UE. In such cases, i.e., the first SL UE may schedule the transmission of the TB, or transmit the TB, via the PSSCH transmission resource 312*b* starting at the transmission starting point 310.

In some aspects, the TB scheduled for transmission or transmitted to the second SL UE via the PSSCH transmission resource 312*b* starting at the later transmission starting point 310 may include a portion of the data included in the TB that the first SL UE attempted to transmit at the initial transmission starting point 308*a* (but failed to transmit because of the failed LBT at that initial transmission starting point 308*a*). In other words, for example, the PSSCH time-frequency resource blocks available for the first SL UE to transmit data starting at the later transmission starting point 310 (e.g., where the LBT procedure was successful) may be less than the PSSCH time-frequency resource blocks available starting at any prior transmission starting point in the same slot 302*b* (e.g., where the LBT procedures were unsuccessful). As such, any TB scheduled for transmission or transmitted starting at the later transmission starting point 310 may include less data than a TB that would have been scheduled for transmission or transmitted starting at any of the prior transmission starting points if the LBT procedures at those starting points were successful.

In some aspects, a PSSCH transmission resource reserved for a first SL UE to transmit a first TB may be pre-empted by a second TB that may have higher priority than the first TB and is configured to be transmitted by a second SL UE. That is, the second SL UE may attempt to transmit or schedule the transmission of a second TB having a higher priority than the first TB via the same PSSCH transmission resource reserved for the first SL UE to transmit the first TB. In such cases, the first TB and the second TB may collide as both transport blocks may be occupying the same channel at the same time. To avoid such collisions, in some aspects, the first SL UE may monitor the reserved PSSCH transmission resource for a control message (e.g., SCI, MAC-CE, PC5-RRC, upper layer control packet, etc.) from other SL UEs (e.g., from the second SL UE) to determine whether a collision might occur between the first TB from the first SL UE and TBs to be transmitted by the other SL UEs. For example, the first SL UE may monitor the reserved PSSCH transmission resource for a SCI and/or DMRS from another SL UE while performing a LBT procedure for a later transmission starting point. In some aspects, the first SL UE may decode a detected control message (e.g., SCI) from a second SL UE to extract an indication indicating an upcoming TB transmission from the SL UE in the PS SCH transmission resource that is reserved for transmission of the first TB from the first SL UE (and as such, an indication indicating an upcoming collision between the first TB and the upcoming TB transmission). In some aspects, the first SL UE may cancel the transmission of the first TB (e.g., abandon or abort the LBT procedure for transmitting the first TB) if the monitoring and/or decoding of control messages from other SL UEs indicate that a collision between the first TB and TBs from other SL UEs may occur (for instance, the first SL UE may detect a collision signal exceeding a threshold collision signal for abandoning the LBT procedure performed for transmitting the first TB).

In some aspects, the first SL UE (i.e., the SL UE configured to transmit TBs to the second SL UE) may transmit a scrambled DMRS to the second SL UE to allow the second SL UE to differentiate the first TB transmission from the first SL UE from TB transmissions from other SL UE (e.g., TB transmissions that may collide with the first TB). For example, a control message such as a SCI transmitted from the first SL UE may not include sufficient number of common control message bits that allow the second SL UE (i.e., the TB transmission receiving SL UE) to distinguish TB transmission from the first SL UE from TB transmissions from other SL UEs, and in such cases, the scrambled DMRS can be used by the second SL UE to distinguish between the TB transmissions. For example, in some cases where the first SL UE and/or the other SL UEs may transmit to the second SL UE a common DMRS, the second SL UE may not be able to differentiate the TB transmission received from the first SL UE from the TB transmissions received from the other SL UEs, and may assign to the other SL UEs log-likelihood ratios (LLRs) associated with the first SL UE (and vice versa), causing error. In some cases, however, the first SL UE may transmit a scrambled DMRS, allowing the receiving second SL UE to differentiate the TB transmission transmitted by the first SL UE from TB transmissions from the other SL UEs. In such cases, the second SL UE may determine and assign to the first SL UE the correct LLRs, avoiding errors. In some aspects, the DMRS may be scrambled using the identification of the first SL UE (i.e., the TB transmitting UE scrambling the DMRS) and/or the second SL UE (i.e., the TB receiving UE).

In some aspects, the first SL UE may transmit a scrambled DMRS when the first SL UE may not be able to transmit sufficient number of SCI bits in the TB transmission. For example, as discussed above, the TB transmission from the first SL UE may be partial because, for instance, the TB transmission started at a later transmission starting point because of failed LBT procedures at prior transmission starting points. In such cases, the partial TB transmission may not include sufficient number of SCI bits that allows the second SL UE to differentiate the TB transmission from the first SL UE from the TB transmissions from the other SL UEs). The first SL UE may then transmit the scrambled DMRS to allow the first SL UE to differentiate the (e.g., partial) TB transmission received from the first SL UE from the TB transmissions from the other SL UEs. In some aspects, the sufficient number of SCI bits may be pre-configured or may be specified via an RRC message or a system information block (SIB) message at the first SL UE.

In some aspects, as discussed above, after the reservation of the PSSCH transmission resource for use by the first SL UE to transmit the first TB transmission to the second SL UE (e.g., via control messages such as but not limited to SCI messages, etc.), the second SL UE may attempt to decode the first TB transmission. In some cases, the decoding may fail and the second SL UE may conduct a blind decoding using the scrambled DMRS received from the first SL UE. In some aspects, the second SL UE may decode the scrambled DMRS accurately (e.g., the scrambled DMRS is a valid DMRS). In some cases, the second SL UE may store LLR of data symbols after the decoded DMRS symbol. In some cases, the second SL UE may store LLR of all data symbols (including data symbols prior to the decoded DMRS symbol).

Figure 5:
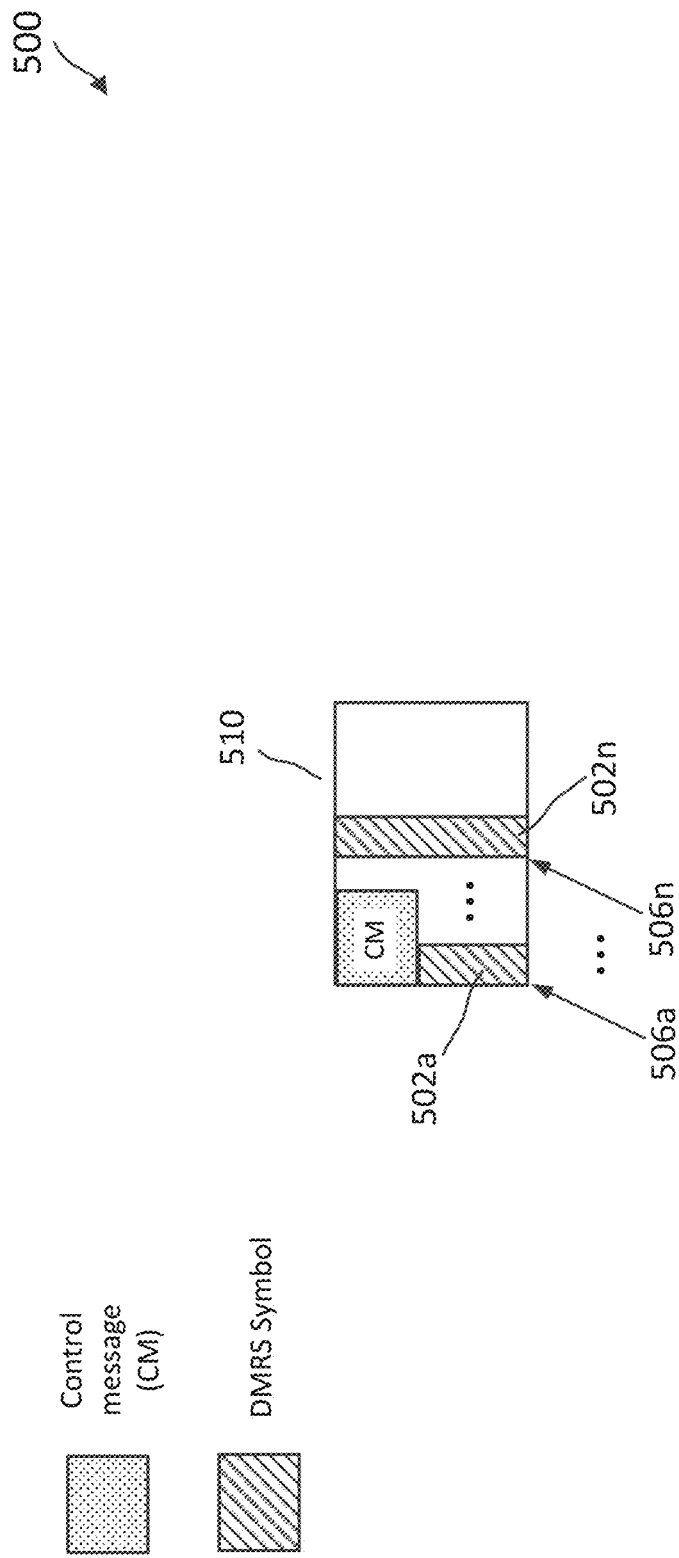
FIG. 5 illustrates time positions of multiple starting points for NR SL transmission within a PSSCH of an unlicensed band, according to some aspects of the present disclosure.

FIG. 5 illustrates time positions of multiple starting points for NR SL transmission within a reserved PSSCH transmission resource of an unlicensed band, according to some aspects of the present disclosure. As discussed above, in some aspects, a reserved PSSCH transmission resource in the slot 510 may have associated therewith multiple transmission starting points 506a . . . 506n and the first SL UE (i.e., the SL UE configured to transmit TBs to the second SL UE) may conduct successive LBT procedures to transmit a TB starting at each of the multiple transmission starting points 506a . . . 506n until a LBT procedure is successful, i.e., until the first SL UE determines that the PSSCH transmission resource is available for TB transmission to the second SL UE. In some aspects, the moments (i.e., time positions) of one or more of the multiple transmission starting points 506a . . . 506n within the PSSCH transmission resource in the slot 510 may be pre-configured or may be configured via SIB messages at the first SL UE.

For example, the last transmission starting point 506n of the multiple transmission starting points 506a . . . 506n of the PSSCH transmission resource in the slot 510 can be configured to immediately precede the last DMRS symbol 502n of the slot 510. As another example, one or more of the multiple transmission starting points 506a . . . 506n can be configured to precede a respective DMRS symbol 502a . . . 502n of the slot 510. For instance, each transmission starting point of the multiple transmission starting points 506a . . . 506n may occur immediately before a respective DMRS symbol 502a . . . 502n. In some aspects, the afore-mentioned configuration of the one or more transmission starting points (e.g., the positioning of the last transmission starting point 506n immediately before the last DMRS symbol 502n and/or the positioning of each or one or more of the multiple transmission starting points 506a . . . 506n immediately preceding a respective DMRS symbols 502a . . . 502n) may be pre-configured or may be specified by SIB at the first SL UE.

In some aspects, the first SL UE (i.e., the SL UE configured to transmit TBs to the second SL UE) may conduct a LBT procedure at the initial transmission starting point (i.e., at the initial boundary of the PSSCH transmission resource) of the multiple transmission starting points to obtain access to the reserved PSSCH transmission resource at the initial transmission starting point. In some aspects, if the LBT procedure fails at the initial transmission starting point, the first SL UE may continue with the LBT procedure until the first SL UE obtains access to the reserved PSSCH transmission resource at one of the rest of the multiple transmission starting points. For example, the first SL UE may draw a random number from a counter and perform a LBT or channel access procedure associated with the random number within a contention window to obtain access to the reserved PSSCH transmission resource at the next transmission starting point (i.e., at the transmission starting point that is next to the initial transmission starting point). The first SL UE may continue this process (drawing a random number from the counter and performing a LBT procedure associated with the drawn random number within a content window) until a LBT procedure is successful at a transmission staring point of the multiple transmission starting points, at which point the first SL UE may transmit a TB to the second SLUE.

For example, with respect to FIG. 3, the first SL UE may draw a random number from a counter at initial transmission starting point 308a and perform a LBT or channel access procedure to obtain access to the reserved PSSCH transmission resource at the initial transmission starting point 308a. In some cases, if that LBT procedure fails at the initial transmission starting point 308a, the first SL UE may continue the LBT procedure with a different random number drawn from the counter (e.g., draw a subsequent random number from the counter excluding the prior random number and perform LBT or channel access procedure) to obtain access to the PSSCH transmission resource at the later transmission starting points 308b . . . 308n, 310 of the multiple transmission starting points 308a . . . 308n, 310. In some cases, when the LBT procedure succeeds and the first SL UE obtains access to the reserved PSSCH transmission resource at a final transmission starting point 310, the first SL UE may transmit a TB to the second SL UE starting at the final transmission starting point 310.

Figure 6:
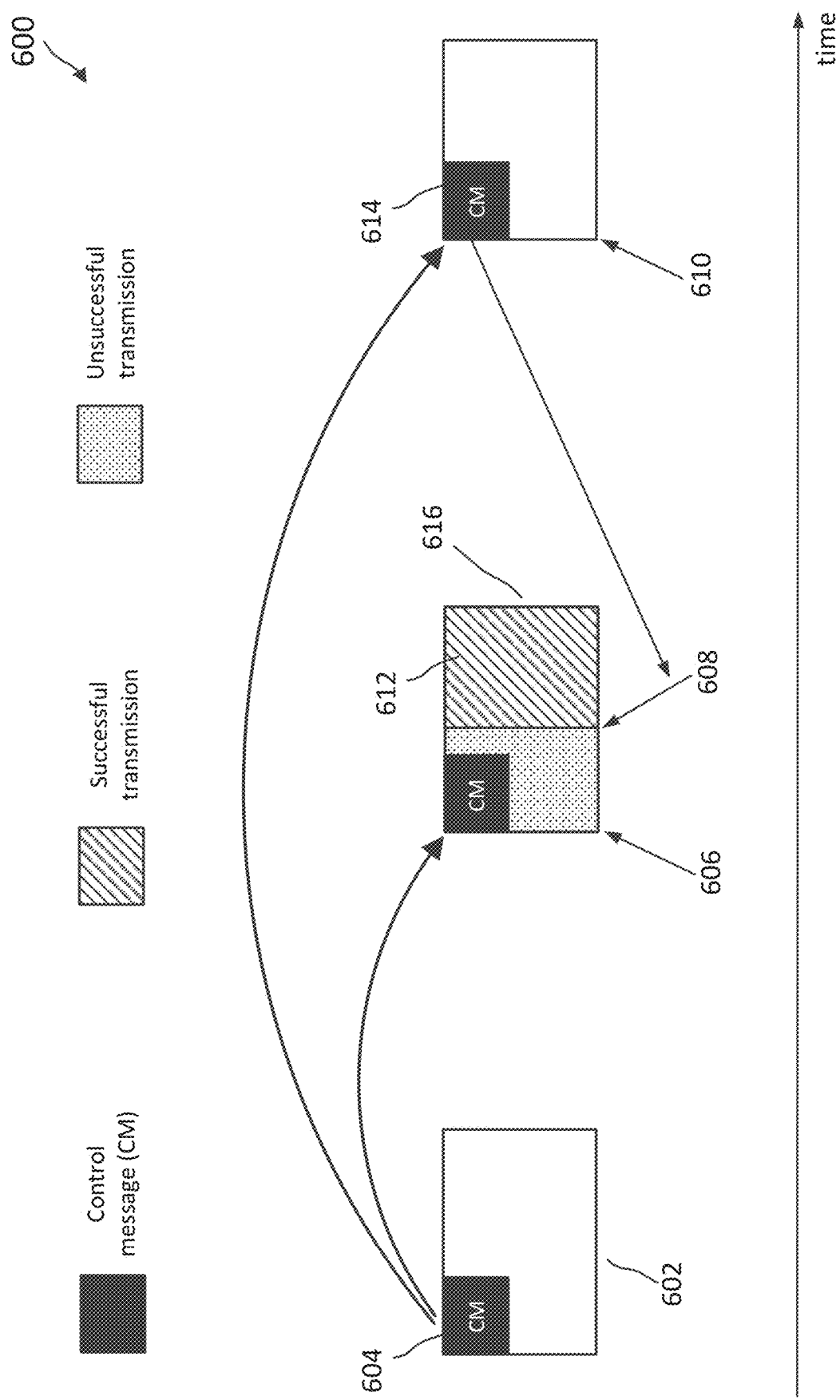
FIG. 6 illustrates an example control message including information about a previous partial NR SL transmission over an unlicensed band, according to some aspects of the present disclosure.

FIG. 6 illustrates an example control message including information about a previous partial NR SL transmission over an unlicensed band, according to some aspects of the present disclosure. In some aspects, as discussed above, a TB transmitted to a second SL UE by a first SL UE via a reserved PSSCH transmission resource starting at a later transmission starting point (i.e., at a transmission starting point after the initial transmission starting point) may include a portion of the data included in the TB that the first SL UE attempted to transmit to the second SL UE at the initial transmission starting point (but failed to transmit because of the failed LBT at that initial transmission starting point). For example, with reference to FIG. 6, a control message 604 in a slot 602 may reserve a PSSCH transmission resource in the slot 618, and a LBT procedure conducted by the first SL UE to obtain access to the reserved PSSCH may fail at the initial transmission starting point 606 but succeed at the later transmission starting point 608. In such cases, the first SL UE may schedule transmission of the TB, or transmit the TB, starting at the later transmission starting point 608, and the TB transmitted in the data region 612 of the slot 616 starting at the later transmission starting point 608 may be a portion of the TB that the first SL UE may have transmitted starting at the initial transmission starting point 606 if the LBT procedure had been successful for that transmission starting point 606. In such cases, the first SL UE may transmit a control message 614 at a later time 610 including information about the partial TB transmission transmitted in the data region 612. For instance, the partial TB transmission in the data region 612 may not include at least sufficient control message bits and the control message 614 may include information to supplant the missing control message bits. In some aspects, the second SL UE that receives the control message 614 may use the control message to identify erroneous DMRS detections. In some aspects, the control message 604 and/or the control message 614 can be SCI message, MAC-CE message, PC5-RRC message, upper layer control packet, etc.

In some aspects, a first SL UE (i.e., the SL UE configured to transmit TBs to the second SL UE) may use a control message to reserve a PSSCH transmission resource in a slot for transmitting a TB to a second SL UE, where the PSSCH transmission resource may have multiple transmission starting points associated therewith, as discussed above. In some aspects, the first SL UE may schedule transmission of the TB, or transmit the TB, at a later transmission starting point (e.g., later than the initial transmission starting point of the multiple transmission starting points) after having received an acknowledgement (ACK) from the second SL acknowledging receiving the PSSCH-reserving control message from the first SL UE. In some aspects, the first SL UE may schedule transmission of the TB, or transmit the TB, at the later transmission starting point only after having received the ACK from the second SL UE. For example, the first SL UE may reserve the PSSCH transmission resource using a SCI (e.g., one sent along with a PSSCH transmission), and the first SL UE may schedule transmission of a TB, or transmit the TB, at a later transmission starting point only after having received an ACK from the second SL UE about the SCI. In some aspects, the first SL UE may deem or consider a HARQ ACK about the PSSCH transmission as an acknowledgement from the second SL UE that the second SL UE has received the PSSCH reserving control message (e.g., SCI). In some aspects, the first SL UE may need an explicit ACK from the second SL UE acknowledging receiving the control message if the HARQ ACK has failed. In such cases, the first SL UE may receive the ACK via MAC-CE or from a physical sidelink feedback channel (PSFCH) symbol. That is, the second SL UE may transmit to the first SL UE an ACK about receiving the control message on PSFCH, which can be code division multiplexed (CDM-ed) or frequency division multiplexed (FDM-ed).

In some aspects, when conducting LBT procedures within a reserved PSSCH transmission resource for later transmission starting points (e.g., compared to for an initial transmission starting point), the first SL UE may be configured to conduct a stricter procedure, in particular to avoid affecting other on-going sidelink transmissions. For example, as discussed above, an LBT procedure performed on a PSSCH based on energy detection is considered to be successful when a signal energy measured from the PSSCH is below an energy detection (ED) threshold and a failure when the measured signal energy exceeds the ED threshold. In some aspects, the stricter LBT procedure for a later transmission starting point (e.g., as compared to an initial transmission starting point) may include an ED threshold than is lower than the ED threshold for the LBT performed at the initial transmission starting point. That is, a LBT may be considered as a failure if a lower signal energy is measured in the PSSCH. For instance, the lower ED threshold can be −82 dBm, compared to −72 dBm for LBT procedure performed for the initial transmission starting point, when using a transmission power of 23 dBm. In some cases, the lower ED threshold for a LBT procedure performed for a later transmission starting point can be −82 dBm if the first SL UE detects control messages (e.g., SCI) from the other on-going sidelink transmissions. In such cases, the first SL UE may abandon the LBT procedure for the later transmission starting point. In some cases, the first SL UE may also abandon the LBT procedure if reservations for the PSSCH transmission resource indicate that other sidelink transmissions may have higher priority than the TB transmission from the first SL UE.

Figure 7:
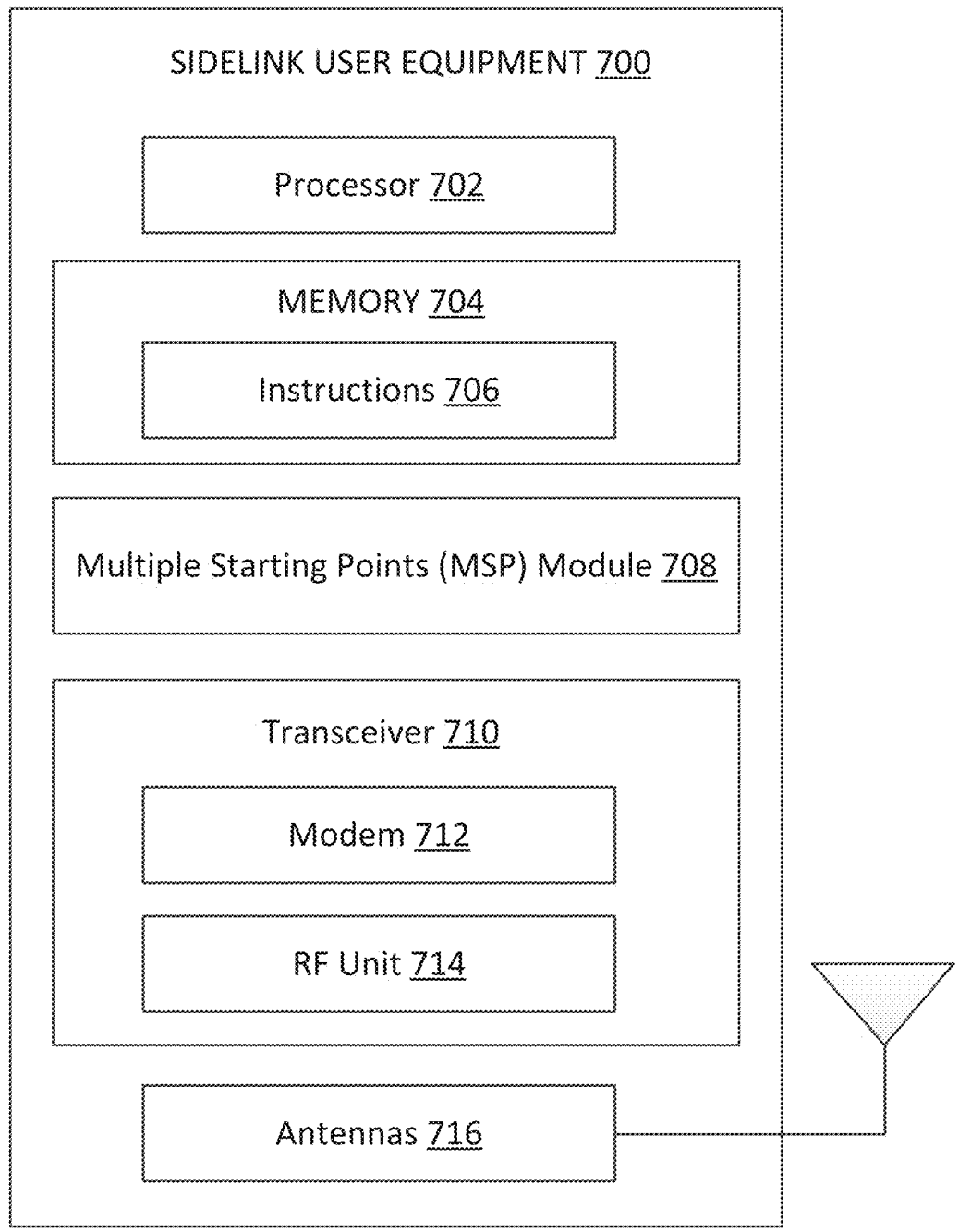
FIG. 7 is a block diagram of an exemplary SL UE, according to some aspects of the present disclosure.

FIG. 7 is a block diagram of an exemplary SL UE 700 according to some aspects of the present disclosure. The SL peripheral UE 700 may be a UE 115 as discussed above with respect to FIG. 1, SL UEs 404a . . . 404b, SL UEs 406a . . . 406b, SL UEs 410, 412, 414 as discussed above with respect to FIG. 3, or first UE and/or second UE as discussed below with respect to FIG. 8. As shown, the SL UE 700 may include a processor 702, a memory 704, a multiple starting points (MSP) module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 1-6 and 9. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The MSP module 708 may be implemented via hardware, software, or combinations thereof. For example, the MSP module 708 may be implemented as a processor, circuit, and/or instructions 706 stored in the memory 704 and executed by the processor 702. In some examples, the MSP module 708 can be integrated within the modem subsystem 712. For example, the MSP module 708 can be implemented by a combination of software components (e.g., executed by a DSP or a general processor) and hardware components (e.g., logic gates and circuitry) within the modem subsystem 712.

The MSP module 708 may be used for various aspects of the present disclosure, for example, aspects of FIGS. 1-6 and 9. The FLPS module 708 is configured to performing a channel access procedure to access a first physical sidelink shared channel (PSSCH) transmission resource of an unlicensed new radio spectrum. In some aspects, the first PSSCH transmission resource may be reserved by a control message and including a plurality of transmission starting points. The FLPS module 708 may also be configured to transmit first data to a second UE via the first PSSCH transmission resource starting at a later transmission starting point than one or more prior transmission starting points of the plurality of transmission starting points when the performing the channel access procedure fails at each of the one or more prior transmission starting points. In some aspects, the one or more prior transmission starting points may include an initial transmission starting point of the plurality of transmission starting points.

As shown, the transceiver 710 may include the modem subsystem 712 and the RF unit 714. The transceiver 710 can be configured to communicate bi-directionally with other devices, such as the BSs 105 and/or the UEs 115, SL UEs 404a . . . 404b, SL UEs 406a . . . 406b, SL UEs 410, 412, 414. The modem subsystem 712 may be configured to modulate and/or encode the data from the memory 704 and/or the MSP module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PSCCH, PSSCH, PSFCH, measurement data, and/or sensor data records) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115, SL UEs 404a . . . 404b, SL UEs 406a . . . 406b, SL UEs 410, 412, 414 to enable the UE to communicate with other devices.

The RF unit 714 may provide the modulated and/or processed data, e.g. data packets (or, more generally, data messages that may include one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PSBCH, sidelink RMSI, PSSCH, PSCCH, PSFCH, PC5-RRC configuration, control commands) to the MPS module 708 for processing. The antennas 716 may include multiple antennas of similar or different designs in order to sustain multiple transmission links. The RF unit 714 may configure the antennas 716.

In an aspect, the SL UE 700 can include multiple transceivers 710 implementing different RATs (e.g., NR and LTE). In an aspect, the SL UE 700 can include a single transceiver 710 implementing multiple RATs (e.g., NR and LTE). In an aspect, the transceiver 710 can include various components, where different combinations of components can implement different RATs.

Figure 8:
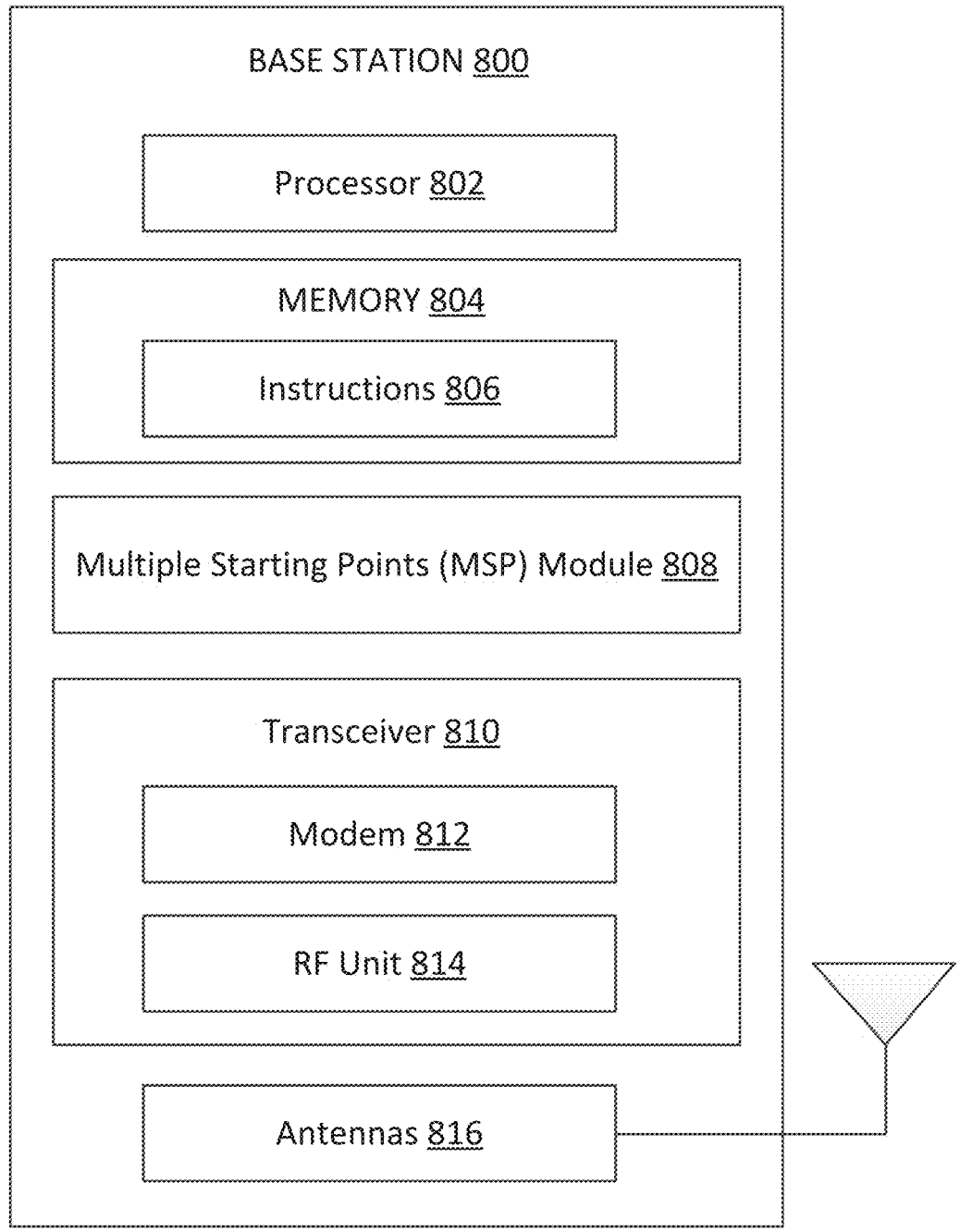
FIG. 8 is a block diagram of an exemplary base station (BS), according to some aspects of the present disclosure.

FIG. 8 is a block diagram of an exemplary BS 800 according to some aspects of the present disclosure. The BS 800 may be a BS 105 in the network 100 as discussed above in FIG. 1, or BS 302 as discussed above in FIG. 3. As shown, the BS 800 may include a processor 802, a memory 804, a multiple staring points (MSP) module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-6 and 9. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The MSP module 808 may be implemented via hardware, software, or combinations thereof. For example, the MSP module 808 may be implemented as a processor, circuit, and/or instructions 806 stored in the memory 804 and executed by the processor 802. In some examples, the MSP module 808 can be integrated within the modem subsystem 812. For example, the MSP module 808 can be implemented by a combination of software components (e.g., executed by a DSP or a general processor) and hardware components (e.g., logic gates and circuitry) within the modem subsystem 812.

The MSP module 808 may be used for various aspects of the present disclosure, for example, aspects of FIGS. 1-6 and 9. The MSP module 808 can be configured to transmit to one or more SL UEs (e.g., SL UEs 404a . . . 404b, SL UEs 406a . . . 406b, SL UEs 410, 412, 414) a configured grant (CG) configured to allocate the first PSSCH transmission resource to the SL UE.

As shown, the transceiver 810 may include the modem subsystem 812 and the RF unit 814. The transceiver 810 can be configured to communicate bi-directionally with other devices, such as the UEs 115, and/or SL UEs 404a . . . 404b, SL UEs 406a . . . 406b, SL UEs 410, 412, 414, and/or another core network element. For example, the transceiver may be configured to transmit to one or more SL UEs (e.g., SL UEs 404a . . . 404b, SL UEs 406a . . . 406b, SL UEs 410, 412, 414) a CG configured to allocate the first PSSCH transmission resource to the SL UE. The modem subsystem 812 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at a UE 115 (and/or the SL UEs 404a . . . 404b, SL UEs 406a . . . 406b, SL UEs 410, 412, 414) to enable the UEs to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PSCCH, PSSCH, PSFCH, measurement data, and/or sensor data records) to the MSP module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
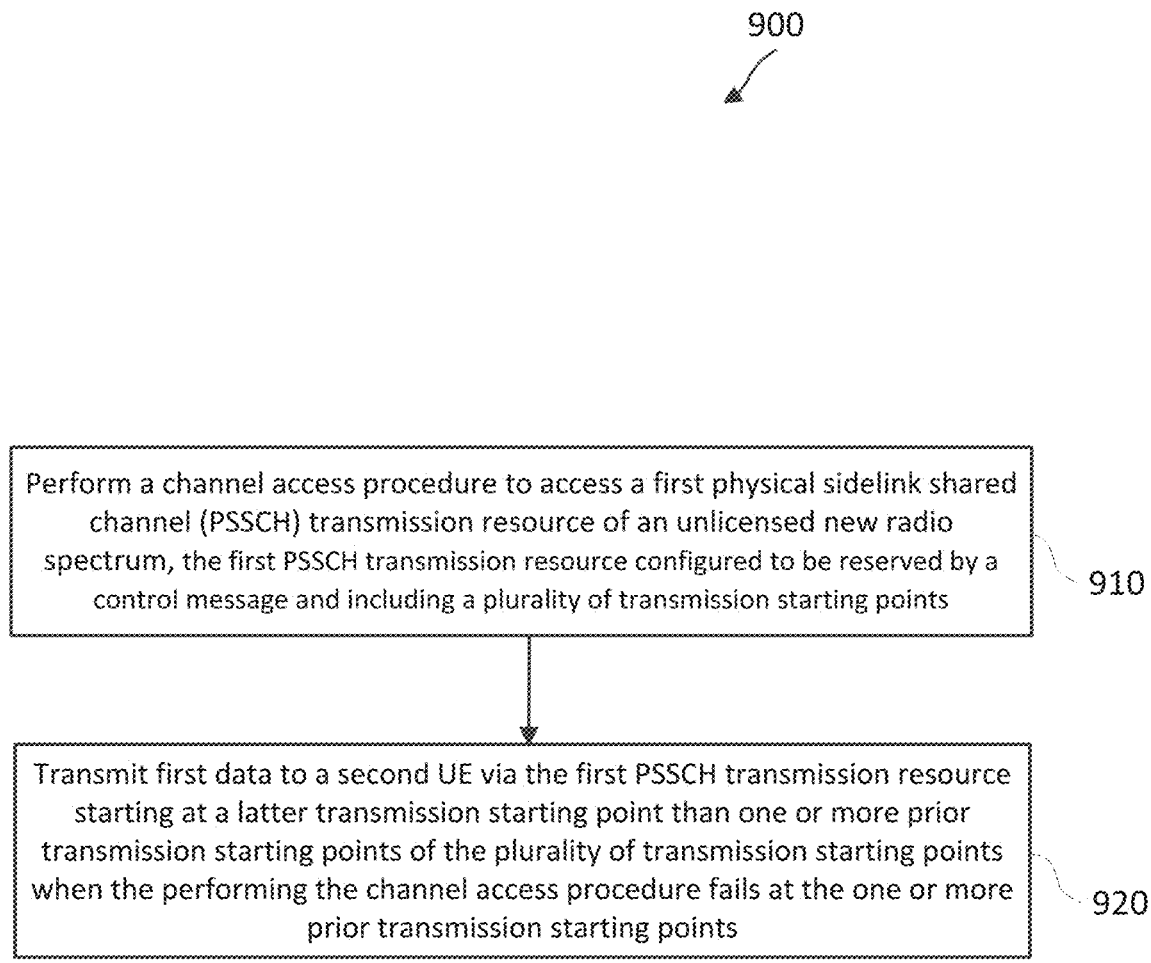
FIG. 9 is a flow diagram illustrating a method for allowing multiple starting points for NR SL transmission over an unlicensed band, according to some aspects of the present disclosure.

FIG. 9 is a flow diagram illustrating a method for allowing multiple starting points for NR SL transmission over an unlicensed band, according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a UE 115, SL UEs 404a . . . 404b, SL UEs 406a . . . 406b, SL UEs 410, 412, 414 or a SL UE 600, may utilize one or more components, such as the processor 602, the memory 604, the MSP module 608, the transceiver 610, the modem 612, and/or the one or more antennas 616, to execute the steps of method 900. The method 900 may employ similar mechanisms as described above in FIGS. 1-6. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a first UE (e.g., sidelink UE) may perform a channel access procedure to access a first physical sidelink shared channel (PSSCH) transmission resource of an unlicensed new radio spectrum. In some aspects, the first PSSCH transmission resource may be reserved by a control message and including a plurality of transmission starting points.

At block 920, the first UE may transmit first data to a second UE via the first PSSCH transmission resource starting at a later transmission starting point than one or more prior transmission starting points of the plurality of transmission starting points when the performing the channel access procedure fails at each of the one or more prior transmission starting points. In some aspects, the one or more prior transmission starting points includes an initial transmission starting point of the plurality of transmission starting points.

In some aspects, the first data is a portion of a transport block configured for transmission, via the first PSSCH transmission resource, starting at the initial transmission starting point of the plurality of transmission starting points. In some aspects, the control message is a sidelink control information (SCI), the method 900 further comprising: transmitting, to the second UE, the SCI to reserve one or more PSSCH transmission resources including the first PSSCH transmission resource. In some aspects, the one or more PSSCH transmission resources include at least two PSSCH transmission resources; and the SCI is configured to reserve the at least two PSSCH transmission resources for transmitting a same transport block. In some aspects, the at least two PSSCH transmission resources include the first PSSCH transmission resource and a second PSSCH transmission resource, the method 900 further comprising: retransmitting, to the second UE, a transport block via the second PSSCH transmission resource without receiving a hybrid automatic request acknowledgment (HARQ ACK) from the second UE after transmitting the transport block to the second UE. In some aspects, the one or more PSSCH transmission resources include at least two PSSCH transmission resources; and the SCI is configured to reserve the at least two PSSCH transmission resources for transmitting different transport blocks.

Some aspects of method 900 further comprise: receiving, from a base station of a wireless communication network to which the first UE is connected, a configured grant (CG) configured to allocate the first PSSCH transmission resource to the first UE. In some aspects, method 900 further comprises transmitting, to the second UE, the control message to reserve the first PSSCH transmission resource for the first UE to transmit to the second UE a transport block that includes the first data. In some aspects, method 900 further comprises receiving, from the second UE, the control message configured to poll the first UE to collect a transport block that includes the first data. In some aspects, the control message is a medium access control (MAC)-control element (CE). In some aspects, the control message is a SCI. In some aspects, the control message is a proximity-based communication (Interface) 5 radio resource control (RRC) message.

In some aspects of method 900, the control message is a downlink control information (DCI), and the method further comprises receiving, from a base station of a wireless communication network to which the first UE and the second UE are connected, the DCI to reserve the first PSSCH transmission resource for the first UE to transmit to the second UE a transport block that includes the first data. In some aspects, an enhanced DCI coupled to the DCI is transmitted from the base station to the second UE to reserve the allocated first PSSCH transmission resource for the first UE to transmit to the second UE a transport block that includes the first data.

In some aspects, the control message is a sidelink control information (SCI), the method 900 further comprising: receiving, from a third UE, the SCI to reserve the first PSSCH transmission resource for the first UE to transmit to the second UE a transport block that includes the first data. In some aspects, the first PSSCH transmission resource is reserved for transmitting a first transport block including the first data, the method 900 further comprising: monitoring the first PSSCH transmission resource for a SCI for an indication of an upcoming transmission, by a third UE, of a second transport block via the first PSSCH transmission resource. In some aspects, the method 900 further comprises: monitoring a physical sidelink control channel (PSCCH) transmission resource of the unlicensed new radio spectrum for a demodulation reference signal (DMRS) for an indication of an upcoming transmission, by a third UE, of a second transport block via the first PSSCH transmission resource. In some aspects, the method 900 further comprises aborting the transmission of the first data when the indication indicates that the second transport block has higher priority than the first transport block. In addition, the method 900 further comprises transmitting, to the second UE, a scrambled DMRS sequence configured to include identifying information of the first UE. In some aspects, the scrambled DMRS sequence is scrambled using an identification of the first UE or an identification of the second UE.

In some aspects, the method 900 further comprises transmitting, to the second UE, a scrambled DMRS sequence configured to include identifying information of the first UE when a number of bits of the SCI associated with the first data is no greater than a threshold number of bits. In some aspects, the threshold number of bits is pre-configured or specified by a RRC message or a system information block (SIB) message. In some aspects, a last transmission starting point of the plurality of transmission starting points immediately precedes a last DMRS symbol of the PSSCH transmission resource. In some aspects, each transmission starting point of the plurality of transmission starting points immediately precedes a respective DMRS symbol of a plurality of DMRS symbols of the PSSCH transmission resource. In some aspects, the plurality of transmission starting points are pre-configured or specified by a SIB message.

In some aspects, the channel access procedure includes: a first channel access procedure for transmitting starting at the initial transmission starting point, the first channel access procedure associated with a random number within a contention window; and a second channel access procedure for transmitting starting at the later transmission starting point, the second channel access procedure associated with a subsequent random number within the contention window; and the performing the channel access procedure includes performing the second channel access procedure after failure of the first channel access procedure to transmit starting at the initial transmission starting point. In some aspects, the method 900 further comprises transmitting, to the second UE and after the transmission of the first data, a SCI including information about the later transmission starting point.

In some aspects, the transmission of the first data occurs after the first UE receives an ACK from the second UE acknowledging receiving the transmitted SCI reserving the first PSSCH transmission resource. In some aspects, the SCI is transmitted to the second UE with second data; and the transmission of the first data occurs after the first UE receives an HARQ ACK from the second UE acknowledging receiving the second data. In some aspects, the channel access procedure includes a first channel access procedure for transmitting starting at the initial transmission starting point and a second channel access procedure for transmitting the first data starting at the later transmission starting point; and an energy detection threshold level of the first channel access procedure is lower than an energy detection threshold level of the second channel access procedure.

In some aspects, the method 900 further comprises monitoring the first PSSCH transmission resource for a SCI for an indication of an upcoming transmission of a second transport block over the first PSSCH transmission resource; and aborting the transmission of the first data based on the indication. In some aspects, the indication indicates that the second transport block has higher priority than the first transport block. In some aspects, the indication indicates that the SCI has an energy level exceeding a pre-determined energy detection threshold.

Recitations of Some Aspects of the Present Disclosure

Aspect 1: A method of wireless communication performed by a first user equipment (UE), the method comprising: performing a channel access procedure to access a first physical sidelink shared channel (PSSCH) transmission resource of an unlicensed new radio spectrum, the first PSSCH transmission resource configured to be reserved by a control message and including a plurality of transmission starting points; and transmitting first data to a second UE via the first PSSCH transmission resource starting at a later transmission starting point than one or more prior transmission starting points of the plurality of transmission starting points when the performing the channel access procedure fails at each of the one or more prior transmission starting points, the one or more prior transmission starting points including an initial transmission starting point of the plurality of transmission starting points.

Aspect 2: The method of aspect 1, wherein the first data is a portion of a transport block configured for transmission, via the first PSSCH transmission resource, starting at the initial transmission starting point of the plurality of transmission starting points.

Aspect 3: The method of aspect 1 or 2, wherein the control message is a sidelink control information (SCI), the method further comprising: transmitting, to the second UE, the SCI to reserve one or more PSSCH transmission resources including the first PSSCH transmission resource.

Aspect 4: The method of aspect 3, wherein: the one or more PSSCH transmission resources include at least two PSSCH transmission resources; and the SCI is configured to reserve the at least two PSSCH transmission resources for transmitting a same transport block.

Aspect 5: The method of aspect 4, wherein the at least two PSSCH transmission resources include the first PSSCH transmission resource and a second PSSCH transmission resource, the method further comprising: retransmitting, to the second UE, a transport block via the second PSSCH transmission resource without receiving a hybrid automatic request acknowledgment (HARQ ACK) from the second UE after transmitting the transport block to the second UE via the first PSSCH transmission resource.

Aspect 6: The method of any of aspects 3-5, wherein: the one or more PSSCH transmission resources include at least two PSSCH transmission resources; and the SCI is configured to reserve the at least two PSSCH transmission resources for transmitting different transport blocks.

Aspect 7: The method of any of aspects 1-6, further comprising: receiving, from a base station of a wireless communication network to which the first UE is connected, a configured grant (CG) configured to allocate the first PSSCH transmission resource to the first UE.

Aspect 8: The method of claim 7, further comprising: transmitting, to the second UE, the control message to reserve the first PSSCH transmission resource for the first UE to transmit to the second UE a transport block that includes the first data.

Aspect 9: The method of any of aspects 1-8, further comprising: receiving, from the second UE, the control message configured to poll the first UE to collect a transport block that includes the first data.

Aspect 10: The method of any of aspects 1-9, wherein the control message is a medium access control (MAC)-control element (CE).

Aspect 11: The method of any of aspects 1-9, wherein the control message is a SCI.

Aspect 12: The method of any of aspects 1-9, wherein the control message is a proximity-based communication (Interface) 5 radio resource control (RRC) message.

Aspect 13: The method of any of aspects 1-12, wherein the control message is a downlink control information (DCI), the method further comprising: receiving, from a base station of a wireless communication network to which the first UE and the second UE are connected, the DCI to allocate the first PSSCH transmission resource for the first UE to transmit to the second UE a transport block that includes the first data.

Aspect 14: The method of aspect 13, wherein an enhanced DCI coupled to the DCI is transmitted from the base station to the second UE to reserve the allocated first PSSCH transmission resource for the first UE to transmit to the second UE a transport block that includes the first data.

Aspect 15: The method of any of aspects 1-14, wherein the control message is a sidelink control information (SCI), the method further comprising: receiving, from a third UE, the SCI to reserve the first PSSCH transmission resource for the first UE to transmit to the second UE a transport block that includes the first data.

Aspect 16: The method of any of aspects 1-15, wherein the first PSSCH transmission resource is reserved for transmitting a first transport block including the first data, the method further comprising: monitoring the first PSSCH transmission resource for a SCI for an indication of an upcoming transmission, by a third UE, of a second transport block via the first PSSCH transmission resource.

Aspect 17: The method of any of aspects 1-16, further comprising: monitoring a physical sidelink control channel (PSCCH) transmission resource of the unlicensed new radio spectrum for a demodulation reference signal (DMRS) for an indication of an upcoming transmission, by a third UE, of a second transport block via the first PSSCH transmission resource.

Aspect 18: The method of claim 16 or 17, further comprising: aborting the transmission of the first data when the indication indicates that the second transport block has higher priority than the first transport block.

Aspect 19: The method of any of aspects 1-18, further comprising: transmitting, to the second UE, a scrambled DMRS sequence configured to include identifying information of the first UE.

Aspect 20: The method of aspect 19, wherein the scrambled DMRS sequence is scrambled using an identification of the first UE or an identification of the second UE.

Aspect 21: The method of any of aspects 3-6, further comprising: transmitting, to the second UE, a scrambled DMRS sequence configured to include identifying information of the first UE when a number of bits of the SCI associated with the first data is no greater than a threshold number of bits.

Aspect 22: The method of aspect 21, wherein the threshold number of bits is pre-configured or specified by a RRC message or a system information block (SIB) message.

Aspect 23: The method of any of aspects 1-22, wherein a last transmission starting point of the plurality of transmission starting points immediately precedes a last DMRS symbol of the PSSCH transmission resource.

Aspect 24: The method of any of aspects 1-23, wherein each transmission starting point of the plurality of transmission starting points immediately precedes a respective DMRS symbol of a plurality of DMRS symbols of the PSSCH transmission resource.

Aspect 25: The method of aspect 23 or 24, wherein the plurality of transmission starting points are pre-configured or specified by a SIB message.

Aspect 26: The method of any of aspects 1-25, wherein: the channel access procedure includes: a first channel access procedure for transmitting starting at the initial transmission starting point, the first channel access procedure associated with a random number within a contention window; and a second channel access procedure for transmitting starting at the later transmission starting point, the second channel access procedure associated with a subsequent random number within the contention window; and the performing the channel access procedure includes performing the second channel access procedure after failure of the first channel access procedure to transmit starting at the initial transmission starting point.

Aspect 27: The method of any of aspects 1-26, further comprising: transmitting, to the second UE and after the transmission of the first data, a SCI including information about the later transmission starting point.

Aspect 28: The method of any of aspects 3, 4, 5, 6, 21, or 22, wherein the transmission of the first data occurs after the first UE receives an ACK from the second UE acknowledging receiving the transmitted SCI reserving the first PSSCH transmission resource.

Aspect 29: The method of any of aspects 3, 4, 5, 6, 21, 22, or 28, wherein: the SCI is transmitted to the second UE with second data; and the transmission of the first data occurs after the first UE receives an HARQ ACK from the second UE acknowledging receiving the second data.

Aspect 30: The method of any of aspects 1-29, wherein: the channel access procedure includes a first channel access procedure for transmitting starting at the initial transmission starting point and a second channel access procedure for transmitting the first data starting at the later transmission starting point; and an energy detection threshold level of the first channel access procedure is lower than an energy detection threshold level of the second channel access procedure.

Aspect 31: The method of any of aspects 1-30, comprising: monitoring the first PSSCH transmission resource for a SCI for an indication of an upcoming transmission of a second transport block over the first PSSCH transmission resource; and aborting the transmission of the first data based on the indication.

Aspect 32: The method of aspect 31, wherein the indication indicates that the second transport block has higher priority than the first transport block.

Aspect 33: The method of aspect 31 or 32, wherein the indication indicates that the SCI has an energy level exceeding a pre-determined energy detection threshold.

Aspect 34: A user equipment (UE), comprising: a memory; a processor coupled to the memory; and a transceiver coupled to the processor, the UE configured to perform the methods of aspects 1-33.

Aspect 35: A user equipment (UE) comprising means for performing the methods of aspects 1-33.

Aspect 36: A non-transitory computer-readable medium (CRM) having program code recorded thereon, the program code comprises code for causing a UE to perform the methods of aspects 1-33.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
performing a channel access procedure to access a first physical sidelink shared channel (PSSCH) transmission resource of an unlicensed new radio spectrum including a first slot with a predetermined number of orthogonal frequency division multiplexing (OFDM) symbols starting at a slot boundary and a plurality of transmission starting points, an initial transmission starting point of the plurality of transmission starting points being at the slot boundary and other transmission starting points of the plurality of transmission starting points being at other OFDM symbols of the first slot,
reserving, via a control message, the first PSSCH transmission resource; and
transmitting first data to a second UE via the first PSSCH transmission resource using a portion less than all of the predetermined number of OFDM symbols of the first slot starting at a later transmission starting point of the first slot than one or more prior transmission starting points of the plurality of transmission starting points of the first slot when the performing the channel access procedure fails at each of the one or more prior transmission starting points,
the one or more prior transmission starting points including the initial transmission starting point.

2. The method of claim 1, wherein the first data is a portion of a transport block configured for transmission, via the first PSSCH transmission resource, starting at the initial transmission starting point of the plurality of transmission starting points.

3. The method of claim 1, wherein the control message is a sidelink control information (SCI), the method further comprising:
transmitting, to the second UE, the SCI to reserve one or more PSSCH transmission resources including the first PSSCH transmission resource.

4. The method of claim 3, wherein:
the one or more PSSCH transmission resources include at least two PSSCH transmission resources; and
the SCI is configured to reserve the at least two PSSCH transmission resources for transmitting a same transport block.

5. The method of claim 4, wherein the at least two PSSCH transmission resources include the first PSSCH transmission resource and a second PSSCH transmission resource, the method further comprising:
retransmitting, to the second UE, a transport block via the second PSSCH transmission resource without receiving a hybrid automatic request acknowledgment (HARQ ACK) from the second UE after transmitting the transport block to the second UE via the first PSSCH transmission resource.

6. The method of claim 3, wherein:
the one or more PSSCH transmission resources include at least two PSSCH transmission resources; and
the SCI is configured to reserve the at least two PSSCH transmission resources for transmitting different transport blocks.

7. The method of claim 3, further comprising:
transmitting, to the second UE, a scrambled DMRS sequence configured to include identifying information of the first UE when a number of bits of the SCI associated with the first data is no greater than a threshold number of bits.

8. The method of claim 3, wherein the transmission of the first data occurs after the first UE receives an ACK from the second UE acknowledging receiving the transmitted SCI reserving the first PSSCH transmission resource.

9. The method of claim 3, wherein:
the SCI is transmitted to the second UE with second data; and
the transmission of the first data occurs after the first UE receives an HARQ ACK from the second UE acknowledging receiving the second data.

10. The method of claim 1, further comprising:
receiving, from a base station of a wireless communication network to which the first UE is connected, a configured grant (CG) configured to allocate the first PSSCH transmission resource to the first UE.

11. The method of claim 10, further comprising:
transmitting, to the second UE, the control message to reserve the first PSSCH transmission resource for the first UE to transmit to the second UE a transport block that includes the first data.

12. The method of claim 1, further comprising:
receiving, from the second UE, a second control message configured to poll the first UE to collect a transport block that includes the first data.

13. The method of claim 1, wherein the control message is a medium access control (MAC)-control element (CE) or a proximity-based communication (Interface) 5 radio resource control (RRC) message.

14. The method of claim 1, wherein the control message is a downlink control information (DCI), the method further comprising:
receiving, from a base station of a wireless communication network to which the first UE and the second UE are connected, the DCI to allocate the first PSSCH transmission resource for the first UE to transmit to the second UE a transport block that includes the first data.

15. The method of claim 14, wherein an enhanced DCI coupled to the DCI is transmitted from the base station to the second UE to reserve the allocated first PSSCH transmission resource for the first UE to transmit to the second UE a transport block that includes the first data.

16. A first user equipment (UE), comprising:
a memory; and
a processor coupled to the memory, the processor configured to:
perform a channel access procedure to access a first physical sidelink shared channel (PSSCH) transmission resource of an unlicensed new radio spectrum including a first slot with a predetermined number of orthogonal frequency division multiplexing (OFDM) symbols starting at a slot boundary and a plurality of transmission starting points, an initial transmission starting point of the plurality of transmission starting points being at the slot boundary and other transmission starting points of the plurality of transmission starting points being at other OFDM symbols of the first slot,
reserve, via a control message, the first PSSCH transmission resource; and
transmit first data to a second UE via the first PSSCH transmission resource using a portion less than all of the predetermined number of OFDM symbols of the first slot starting at a later transmission starting point of the first slot than one or more prior transmission starting points of the plurality of transmission starting points of the first slot when the performing the channel access procedure fails at each of the one or more prior transmission starting points, the one or more prior transmission starting points including the initial transmission starting point.

17. The first UE of claim 16, wherein the control message is a sidelink control information (SCI), the first UE further comprising a transceiver configured to:
receive, from a third UE, the SCI to reserve the first PSSCH transmission resource for the first UE to transmit to the second UE a transport block that includes the first data.

18. The first UE of claim 16, wherein the first PSSCH transmission resource is reserved for transmitting a first transport block including the first data, the processor further configured to:
monitor the first PSSCH transmission resource for a SCI for an indication of an upcoming transmission, by a third UE, of a second transport block via the first PSSCH transmission resource.

19. The first UE of claim 18, wherein the processor is further configured to:
abort the transmission of the first data when the indication indicates that the second transport block has higher priority than the first transport block.

20. The first UE of claim 16, wherein the processor is further configured to:
monitor a physical sidelink control channel (PSCCH) transmission resource of the unlicensed new radio spectrum for a demodulation reference signal (DMRS) for an indication of an upcoming transmission, by a third UE, of a second transport block via the first PSSCH transmission resource.

21. The first UE of claim 16, wherein the processor is further configured to:
transmit, to the second UE, a scrambled DMRS sequence configured to include identifying information of the first UE.

22. The first UE of claim 16, wherein a last transmission starting point of the plurality of transmission starting points immediately precedes a last DMRS symbol of the PSSCH transmission resource.

23. The first UE of claim 16, wherein each transmission starting point of the plurality of transmission starting points immediately precedes a respective DMRS symbol of a plurality of DMRS symbols of the PSSCH transmission resource.

24. The first UE of claim 16, wherein:
the channel access procedure includes:
a first channel access procedure for transmitting starting at the initial transmission starting point, the first channel access procedure associated with a random number within a contention window; and
a second channel access procedure for transmitting starting at the later transmission starting point, the second channel access procedure associated with a subsequent random number within the contention window; and
the processor is configured to perform the second channel access procedure after failure of the first channel access procedure to transmit starting at the initial transmission starting point.

25. The first UE of claim 16, further comprising a transceiver configured to:
transmit, to the second UE and after the transmission of the first data, a SCI including information about the later transmission starting point.

26. The first UE of claim 16, wherein:
the channel access procedure includes a first channel access procedure for transmitting starting at the initial transmission starting point and a second channel access procedure for transmitting the first data starting at the later transmission starting point; and an energy detection threshold level of the first channel access procedure is lower than an energy detection threshold level of the second channel access procedure.

27. The first UE of claim 16, wherein the processor is further configured to:

monitor the first PSSCH transmission resource for a SCI for an indication of an upcoming transmission of a second transport block over the first PSSCH transmission resource; and abort the transmission of the first data based on the indication.

28. The first UE of claim 27, wherein the indication indicates that the second transport block has higher priority than the first transport block and/or the SCI has an energy level exceeding a pre-determined energy detection threshold.

29. A non-transitory computer-readable medium (CRM) having program code recorded thereon, the program code comprising:

code for causing a first user equipment (UE) to perform a channel access procedure to access a physical sidelink shared channel (PSSCH) transmission resource of an unlicensed new radio spectrum including a first slot with a predetermined number of orthogonal frequency division multiplexing (OFDM) symbols starting at a slot boundary and a plurality of transmission starting points, an initial transmission starting point of the plurality of transmission starting points being at the slot boundary and other transmission starting points of the plurality of transmission starting points being at other OFDM symbols of the first slot, code for causing the first UE to reserve, via a control message, the PSSCH transmission resource; and code for causing the first UE to transmit data to a second UE via the PSSCH transmission resource using a portion less than all of the predetermined number of OFDM symbols of the first slot starting at a later transmission starting point of the first slot than one or more prior transmission starting points of the plurality of transmission starting points of the first slot when the performing the channel access procedure fails at each of the one or more prior transmission starting points, the one or more prior transmission starting points including the initial transmission starting point.

30. A first user equipment (UE), comprising:

means for performing a channel access procedure to access a physical sidelink shared channel (PSSCH) transmission resource of an unlicensed new radio spectrum including a first slot with a predetermined number of orthogonal frequency division multiplexing (OFDM) symbols starting at a slot boundary and a plurality of transmission starting points, an initial transmission starting point of the plurality of transmission starting points being at the slot boundary and other transmission starting points of the plurality of transmission starting points being at other OFDM symbols of the first slot, means for reserving, via a control message, the PSSCH transmission resource; and means for transmitting data to a second UE via the PSSCH transmission resource using a portion less than all of the predetermined number of OFDM symbols of the first slot starting at a later transmission starting point of the first slot than one or more prior transmission starting points of the plurality of transmission starting points of the first slot when the performing the channel access procedure fails at each of the one or more prior transmission starting points, the one or more prior transmission starting points including the initial transmission starting point.

* * * * *